United States Patent
Heckerman et al.

(10) Patent No.: US 6,216,134 B1
(45) Date of Patent: Apr. 10, 2001

(54) METHOD AND SYSTEM FOR VISUALIZATION OF CLUSTERS AND CLASSIFICATIONS

(75) Inventors: David E. Heckerman, Bellevue; David Maxwell Chickering, Redmond; Usama M. Fayyad, Mercer Island; Christopher A. Meek, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/104,751

(22) Filed: Jun. 25, 1998

(51) Int. Cl.$^7$ .................................................... G06F 17/30
(52) U.S. Cl. .................. 707/104; 707/4; 707/5; 707/10; 707/103; 705/26; 704/202; 704/206; 345/347; 381/41
(58) Field of Search .................. 707/2, 3, 5, 10, 707/104, 4, 100, 103, 200, 522; 381/41; 705/23, 5, 10, 26; 706/2; 704/9, 103, 522; 701/200, 202, 206, 208; 345/347; 455/2, 4.2; 382/225, 229; 711/157, 173; 713/200; 709/201, 219

(56) References Cited

U.S. PATENT DOCUMENTS

| | | | |
|---|---|---|---|
| 4,903,305 | * | 2/1990 | Gillick et al. .......................... 381/41 |
| 5,506,986 | * | 4/1996 | Healy .................................... 707/204 |
| 5,537,586 | | 7/1996 | Amram et al. ........................ 395/600 |
| 5,742,816 | * | 4/1998 | Barr et al. ............................. 707/104 |
| 5,758,072 | * | 5/1998 | Filepp et al. .......................... 709/220 |
| 5,768,578 | * | 6/1998 | Kirk et al. ............................. 707/100 |
| 5,787,414 | * | 7/1998 | Miike et al. ............................... 707/2 |
| 5,832,484 | * | 11/1998 | Sankaran et al. ........................ 707/8 |
| 5,835,905 | * | 11/1998 | Pirolli et al. ............................. 707/3 |

(List continued on next page.)

FOREIGN PATENT DOCUMENTS

| | | |
|---|---|---|
| WO 90/04231 | 4/1990 | (WO) . |
| WO 95/31788 | 11/1995 | (WO) . |
| WO 95/34884 | 12/1995 | (WO) . |
| WO 96/28787 | 9/1996 | (WO) . |

OTHER PUBLICATIONS

Brunk, Cliff et al., "MineSet: An Integrated System for Data Mining," Data Mining and Visualization, AAAI Press, 1997.

Cheeseman et al., "Bayesian Classification AutoClass: Theory and Results," *Advances in Knowledge Discovery and Data Mining*, AAAI Press, 1995.

Chickering, David Maxwell et al., A Bayesian Approach to Learning Bayesian Networks with Local Structure [Web Page] 1997; http://www.lis.pitt.edu/~dsl/UAI97/Chickering.UAI97.html[Accessed Jun. 17, 1998].

(List continued on next page.)

*Primary Examiner*—Hosain T. Alam
*Assistant Examiner*—Shahid Alam
(74) *Attorney, Agent, or Firm*—Michaelson & Wallace; Peter L. Michaelson

(57) ABSTRACT

A system that provides for the graphic visualization of the categories of a collection of records. The graphic visualization is referred to as "category graph." The system optionally displays the category graph as a "similarity graph" or a "hierarchical map." When displaying a category graph, the system displays a graphic representation of each category. The system displays the category graph as a similarity graph or a hierarchical map in a way that visually illustrates the similarity between categories. The display of a category graph allows a data analyst to better understand the similarity and dissimilarity between categories. A similarity graph includes a node for each category and an arc connecting nodes representing categories whose similarity is above a threshold. A hierarchical map is a tree structure that includes a node for each base category along with nodes representing combinations of similar categories.

42 Claims, 23 Drawing Sheets

U.S. PATENT DOCUMENTS

| | | | | |
|---|---|---|---|---|
| 5,850,516 | * | 12/1998 | Schneier | 713/200 |
| 5,873,099 | * | 2/1999 | Hogan et al. | 707/204 |
| 5,903,892 | * | 5/1999 | Hoffert et al. | 707/10 |
| 5,911,139 | * | 6/1999 | Jain et al. | 707/3 |
| 5,913,205 | * | 6/1999 | Jain et al. | 707/2 |
| 5,915,250 | * | 6/1999 | Jain et al. | 707/100 |
| 5,920,873 | * | 7/1999 | Van Huben et al. | 707/202 |
| 5,953,725 | * | 9/1999 | Eprahim et al. | 707/103 |
| 5,991,756 | * | 11/1999 | Wu | 707/3 |
| 6,006,230 | * | 12/1999 | Ludwig et al. | 707/10 |
| 6,038,559 | * | 3/2000 | Ashby et al. | 707/4 |
| 6,088,717 | * | 7/2000 | Reed et al. | 709/201 |
| 6,094,654 | * | 7/2000 | Van Huben et al. | 707/8 |

OTHER PUBLICATIONS

Duda, Richard O. and Peter E. Hart, "Pattern Classification and Scene Analysis," John Wiley ans Sons, London, 1973, Chapters 2,4–6, pp. 10–43 and 85–260.

Heckerman, David E. *Probabilistic Similarity Networks,* MIT Press, 1990, Chapter 3 "Theory of Similarity Networks", pp. 53–103.

Johnson, Richard A. Dean W. Wichern, *Applied Multivariate Statistical Analysis,* Prentice–Hall, Inc., Englewood Cliffs, New Jersey, 1982, Chapter 11, "Clustering", pp. 532–560.

Rasmussen, Edie, "Clustering Algorithms," in William B. Frakes and Ricardo Baeza–Yates (eds.) *Information Retrieval: Data Structures and Algorithms,* Prentice Hall, Englewood Cliffs, New Jersey, 1992, pp. 419–442.

Schachter, Ross D. and Mark A. Peot, "Simulation Approaches to General Probablistic Interface on Belief Networks," in Max Herrion et al. (eds.), *Uncertainty in Artificial Intelligence 5,* Elsevier Science Publishers B.V., North Holland, 1990, pp. 221–231.

Spiegelhalter, David J. and Robin P. Knill–Jones "Statistical and Knowledge–based Approaches to Clinical Decision-–support Systems, with an Application in Gastroenterology," *Journal of the Royal Statistical Society,* 147:35–77, 1984.

Semio Corporation, [Alta Vista Site] 1998; http:/www.semio.com.

* cited by examiner

| Record | Att1 | Att2 | Att3 | Att4 | ... | Att M-1 | Att M |
|--------|------|------|------|------|-----|---------|-------|
| 1 | 1 | 0 | 1 | 34 | | 10 | 0 |
| 2 | 1 | 0 | 1 | 36 | | 11 | 0 |
| 3 | 0 | 1 | 0 | 10 | | 11 | 1 |
| ... | | | | | | | |
| N-1 | 0 | 1 | 0 | 9 | | 11 | 1 |
| N | 1 | 0 | 0 | 30 | | 10 | 0 |

*Fig. 1A*

| Record | Att1 | Att2 | Att3 | Att4 | ... | Att M-1 | Att M | CLASS |
|---|---|---|---|---|---|---|---|---|
| 1 | 1 | 0 | 1 | 34 | | 10 | 0 | A |
| 2 | 1 | 0 | 1 | 36 | | 11 | 0 | B |
| 3 | 0 | 1 | 0 | 10 | | 11 | 1 | C |
| ... | | | | | | | | |
| N-1 | 0 | 1 | 0 | 9 | | 11 | 1 | C |
| N | 1 | 0 | 0 | 30 | | 10 | 0 | A |

*Fig. 1B*

| Record | Att1 | Att2 | Att3 | Att4 | ... | Att M-1 | Att M | CLASS |
|---|---|---|---|---|---|---|---|---|
| 1 | 1 | 0 | 1 | 34 | | 10 | 0 | A |
| 2 | 1 | 0 | 1 | 36 | | 11 | 0 | B |
| 3 | 0 | 1 | 0 | 10 | | 11 | 1 | C |
| ... | | | | | | | | |
| N-1 | 0 | 1 | 0 | 9 | | 11 | 1 | C |
| N | 1 | 0 | 0 | 30 | | 10 | 0 | A |
| N+1 | 1 | 0 | 1 | 35 | | 11 | 0 | B |

*Fig. 1C*

| Record | Att1 | Att2 | Att3 | Att4 | ... | Att M-1 | Att M | CLUSTER |
|---|---|---|---|---|---|---|---|---|
| 1 | 1 | 0 | 1 | 34 | | 10 | 0 | A |
| 2 | 1 | 0 | 1 | 36 | | 11 | 0 | A |
| 3 | 0 | 1 | 0 | 10 | | 11 | 1 | B |
| ... | | | | | | | | |
| N-1 | 0 | 1 | 0 | 9 | | 11 | 1 | B |
| N | 1 | 0 | 0 | 30 | | 10 | 0 | A |

*Fig. 1D*

METHOD AND SYSTEM FOR VISUALIZATION OF CLUSTERS AND CLASSIFICATIONS

TECHNICAL FIELD

This invention relates generally to user interfaces and, more specifically, to user interfaces for visualization of categories of data.

BACKGROUND OF THE INVENTION

Computer systems have long been used for data analysis. For example, the data may include the demographics of users and web pages accessed by users. A web master (i.e., a manager of a web site) may desire to review the web page access patterns of the users in order to optimize the links between the various web pages or to customize advertisements to the demographics of the users. However, it may be very difficult for the web master to analyze the access patterns of thousands of users involving possibly hundreds of web pages. However, the difficulty in the analysis may be lessened if the users can be categorized by common demographics and common web page access patterns. Two techniques of data categorization—classification and clustering—can be useful when analyzing large amounts of such data. These categorization techniques are used to categorize data represented as a collection of records containing values for various attributes. For example, each record may represent a user, and the attributes describe various characteristics of the user. The characteristics may include the sex, income, and age of the user, or web pages accessed by the user. FIG. 1A illustrates a collection of records as a table. Each record (1,2, . . . ,n) contains a value for each of the attributes (1,2, . . . ,m). For example, attribute 4 may represent the age of a user and attribute 3 may indicate whether the user has accessed a certain web page. Therefore, the user represented by record 2 accessed the web page as represented by attribute 3 and is age 36 as represented by attribute 4.

Classification techniques allow a data analyst (e.g., web master) to group the records of a collection into classes. That is, the data analyst reviews the attributes of each record, identifies classes, and then assigns each record to a class. FIG. 1B illustrates the results of the classification of a collection. The data analyst has identified three classes: A, B, and C. In this example, records 1 and n have been assigned to class A; record 2 has been assigned to class B, and records 3 and n−1 have been assigned to class C. Thus, the data analyst determined that the attributes for rows 1 and n are similar enough to be in the same class. In this example, a record can only be in one class. However, certain records may have attributes that are similar to more than one class. Therefore, some classification techniques, and more generally some categorization techniques, assign a probability that each record is in each class. For example, record 1 may have a probability of 0.75 of being in class A, a probability of 0.1 of being in class B, and a probability of 0.15 of being in class C. Once the data analyst has classified the records, standard classification techniques can be applied to create a classification rule that can be used to automatically classify new records as they are added to the collection. (e.g., Duda, R., and Hart, P., *Pattern Classification and Scene Analysis*, Wiley, 1973) FIG. 1C illustrates the automatic classification of record n+1 when it is added to the collection. In this example, the new record was automatically assigned to class B.

Clustering techniques provide an automated process for analyzing the records of the collection and identifying clusters of records that have similar attributes. For example, a data analyst may request a clustering system to cluster the records into five clusters. The clustering system would then identify which records are most similar and place them into one of the five clusters. (e.g., Duda and Hart) Also, some clustering systems automatically determine the number of clusters. FIG. 1D illustrates the results of the clustering of a collection. In this example, records 1, 2, and n have been assigned to cluster A, and records 3 and n−1 have been assigned to cluster B. Note that in this example the values stored in the column marked "cluster" in FIG. 1D have been determined by the clustering algorithm.

Once the categories (e.g., classes and clusters) are established, the data analyst can use the attributes of the categories to guide decisions. For example, if one category represents users who are mostly teenagers, then a web master may decide to include advertisements directed to teenagers in the web pages that are accessed by users in this category. However, the web master may not want to include advertisements directed to teenagers on a certain web page if users in a different category who are senior citizens also happen to access that web page frequently. Even though the categorization of the collection may reduce the amount of data, a data analyst needs to review from thousands of records to possibly 10 or 20 categories. The data analyst still needs to understand the similarity and dissimilarity of the records in the categories so that appropriate decisions can be made.

SUMMARY OF THE INVENTION

An embodiment of the present invention provides a category visualization ("CV") system that presents a graphic display of the categories of a collection of records referred to as "category graph." The CV system may optionally display the category graph as a "similarity graph" or a "hierarchical map." When displaying a category graph, the CV system displays a graphic representation of each category. The CV system displays the category graph as a similarity graph or a hierarchical map in a way that visually illustrates the similarity between categories. The display of a category graph allows a data analyst to better understand the similarity and dissimilarity between categories. A similarity graph includes a node for each category and an arc connecting nodes representing categories whose similarity is above a threshold. A hierarchical map is a tree structure that includes a node for each base category along with nodes representing combinations of similar categories.

In another aspect of the present invention, the CV system calculates and displays various characteristic and discriminating information about the categories. In particular, the CV system displays information describing the attributes of a category that best discriminate the records of that category from another category. The CV system also displays information describing the attributes that are most characteristic of a category.

BRIEF DESCRIPTION OF THE DRAWINGS

FIG. 1A illustrates a collection of records as a table.

FIG. 1B illustrates the results of the classification of a collection.

FIG. 1C illustrates the automatic classification of record when it is added to the collection.

FIG. 1D illustrates the results of the clustering of a collection.

DETAILED DESCRIPTION OF THE INVENTION

Figure 2A:
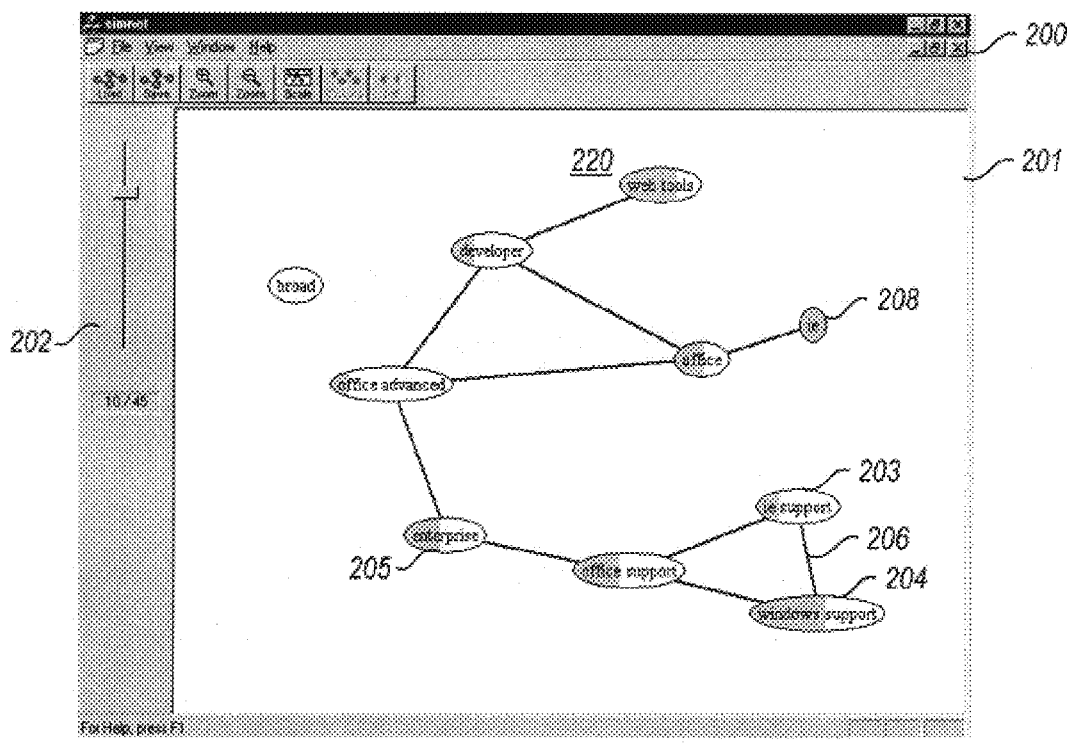
FIGS. 2A–2F illustrate example displays of a similarity network.

An embodiment of the present invention provides a category visualization ("CV") system that presents a graphic display of the categories of a collection of records referred to as "category graph." The CV system may optionally display the category graph as a "similarity graph" or a "hierarchical map." When displaying a category graph, the CV system displays a graphic representation of each category. The CV system displays the category graph as a similarity graph or a hierarchical map in a way that visually illustrates the similarity between categories. The display of a category graph allows a data analyst to better understand the similarity and dissimilarity between categories.

A similarity graph includes a node for each category and an arc connecting nodes representing categories that are similar. The CV system allows the data analyst to select a similarity threshold and then displays arcs between nodes representing pairs of categories whose similarity is above the similarity threshold. Similarity is a rating of how similar the records of one category are to the records of another category. A mathematical basis for similarity is provided below. As a data analyst changes the similarity threshold, the CV system adds and removes arcs between the nodes based on the decrease or increase of the similarity threshold. The CV system also allows the data analyst to combine categories that are most similar and to split a combined category into its sub-categories. The CV system updates the display of the similarity graph to reflect the combining and splitting of categories.

A hierarchical map includes a node for each base category along with nodes representing combinations of similar categories. A base category is a category identified by a categorization process (e.g., classification and clustering), whereas a combined category has been assigned the records of two or more base categories. A leaf node representing each base category forms the bottom of the hierarchy, and a root node representing a category that contains all the records in the collection forms the top of the hierarchy. Each non-leaf node represents a combined category. Each non-leaf node has two arcs that connect the non-leaf node to the two nodes representing the sub-categories of the combined categories represented by the non-leaf node. To form the hierarchy, the CV system starts with the base categories and combines the two base categories that are most similar to form a combined category. The CV system then combines the two categories (including combined categories, but not including any category that has already been combined) that are most similar. The CV system repeats this process until one combined category represents all the records in the collection.

The CV system allows a data analyst to interact with a category graph to obtain further information relating to the categories. In response to a data analyst selecting a displayed graphic representation, the CV system displays additional information about the represented category. For example, the CV system may display the number of records in the category or characteristic attributes of the category. In response to a data analyst selecting a displayed arc, the CV system displays information relating to the categories connected by the arc. For example, if the data analyst selects an arc in a similarity network, then the CV system may display the similarity value for the two categories represented by the nodes that the selected arc connects. The CV system also allows the user to de-emphasize (e.g., hide) the nodes representing certain categories so that data analysts may focus their attention on the other non-de-emphasized categories.

Although a mathematical basis for similarity is provided below in detail, similarity can be defined in many different ways. Conceptually, similarity refers to a rating of the differences between the attribute values of the records in one category and the attribute values of the records in another category. A low value for similarity indicates that there is little difference between the records in the two categories.

FIGS. 2A–2F illustrate example displays of a similarity network. The similarity network illustrates the similarity between ten categories, which have been named based on web page access attributes. Table 1 lists the names of the categories and numbers of records in each category.

TABLE 1

| Category Name | Number of Records |
| --- | --- |
| broad | 18 |
| web tools | 15789 |
| developer | 6632 |
| advanced office | 3868 |
| office | 12085 |
| ie | 22621 |
| enterprise | 10162 |
| office support | 9516 |
| ie support | 6687 |
| windows support | 12618 |

Window 200 contains a display area 201 and a slider 202. The similarity network 220 within the display area contains a node for each category and an arc for each pair of categories whose similarity is above the similarity threshold. For example, node 203 representing category "ie support" and node 204 representing category "windows support" have a similarity that is above the similarity threshold and are thus connected by arc 206. However, the similarity between category "ie support" and category "enterprise" is below the similarity threshold. Therefore, the similarity network has no arc between node 205 representing category "enterprise" and node 203 representing category "ie support."

Figure 2B:
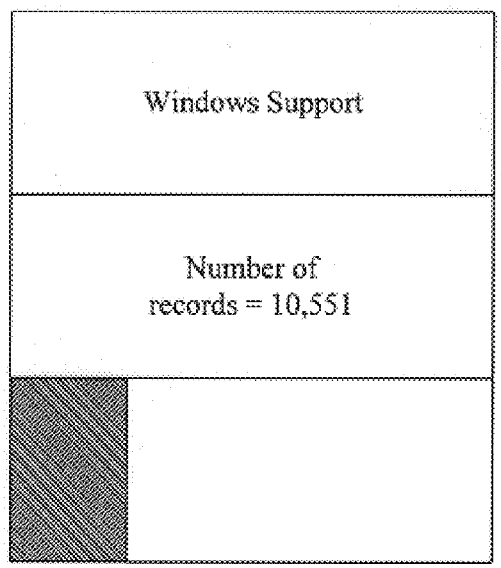

The shading within the nodes of the similarity graph indicate the size (i.e., number of records) of the category that the node represents relative to the category with the most number of records. Since category "ie" contains more records than any other category, the CV system shades the entire node representing category "ie." Since category "windows support" has a number of records that is approximately one-half the number of records in category "ie," the CV system shades approximately one-half of the node representing category "windows support." Alternatively, the shading of the nodes can represent the number of records in the category in relation to a total number of records in the collection. In such a case, the CV system would shade approximately 10% of the node representing a category that contains 10% of the records of the collection. The nodes of a category graph can also have various graphic shapes. The nodes of the similarity graph in this example are displayed as an oval containing the name of the category that the node represents. Alternatively, the nodes may be any shape such as a circle or a rectangle. FIG. 2B illustrates a sample rectangular node. The node contains the name of the category and the number of records in the category. The node also contains a shaded portion indicating that the proportion of the number of records in that category to the total number of records in the collection. In an alternative embodiment, the node might also display other statistical information such as the average value of an attribute (e.g., age) for records in the category or the mode of an attribute (e.g., color).

Figure 2C:
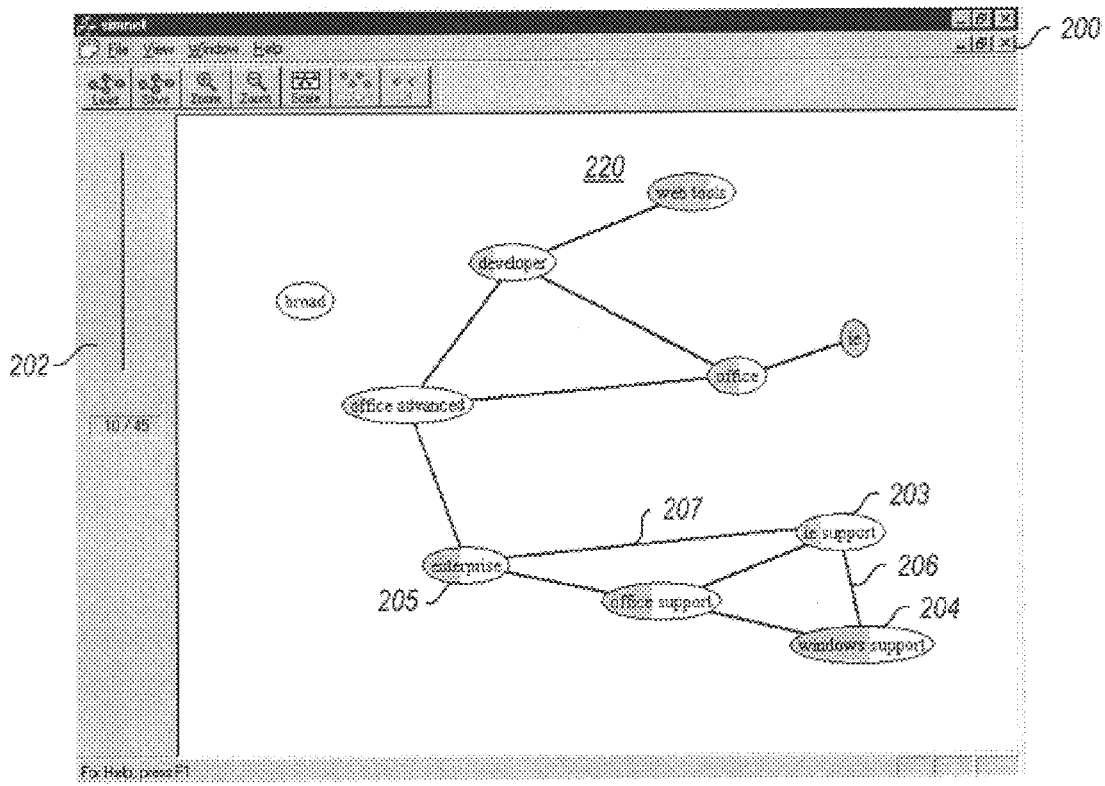

The CV system provides the vertical slider 202, which alternatively may be displayed as a horizontal slider, to allow the data analyst to set the similarity threshold. As the data analyst moves the slider up and down, the similarity threshold increases or decreases. FIG. 2C illustrates the example similarity graph after the data analyst has decreased the similarity threshold by moving the slider down. In this example, the similarity between category "enterprise" and category "ie support" is now greater than the similarity threshold. Thus, the CV system displays an arc 207 between node 205 representing category "enterprise" and node 203 representing category "ie support." If the data analyst then increases the similarity threshold by moving the slider to where it was previously positioned, then the CV system would remove arc 207.

Figure 2D:
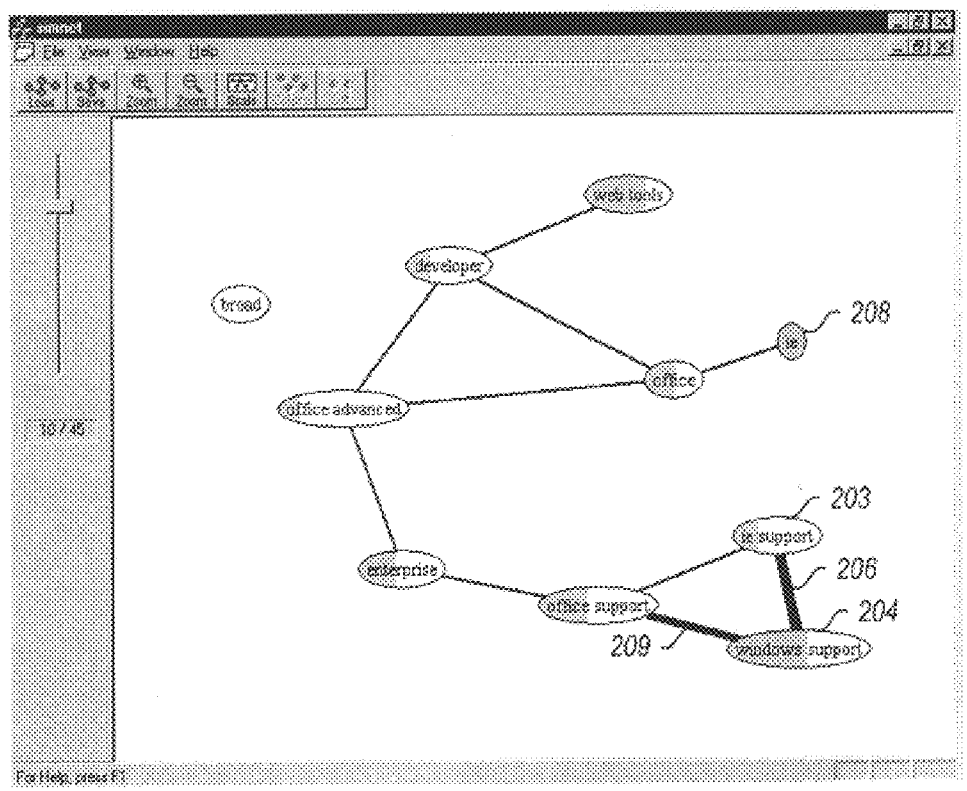

Although the arcs of FIG. 2C indicate categories whose similarity is above the similarity threshold, the arcs do not indicate relative similarity between categories. FIG. 2D illustrates the example similarity graph indicating relative similarity. The CV system indicates the relative similarity of two categories by the thickness of the arc connecting the nodes. That is, the CV system displays a thick arc to connect nodes representing categories that are similar, and displays a thin arc to connect nodes representing categories that are not similar. In this example, since category "ie support" and category "windows support" are the most similar categories, the CV system has drawn the arc 206 connecting the node 203 representing category "ie support" and node 204 representing category "windows support" as the thickest. The CV system may alternatively use various graphic representations as indications of similarity between categories. For example, the proximity of the nodes to one another may indicate the similarity. That is, nodes that are displayed closest to each other are most similar. Also, the similarity of nodes may be indicated by the color of the arcs. For example, a green arc may indicate a high degree of similarity, whereas a red arc may indicate a low degree of similarity.

Figure 2E:
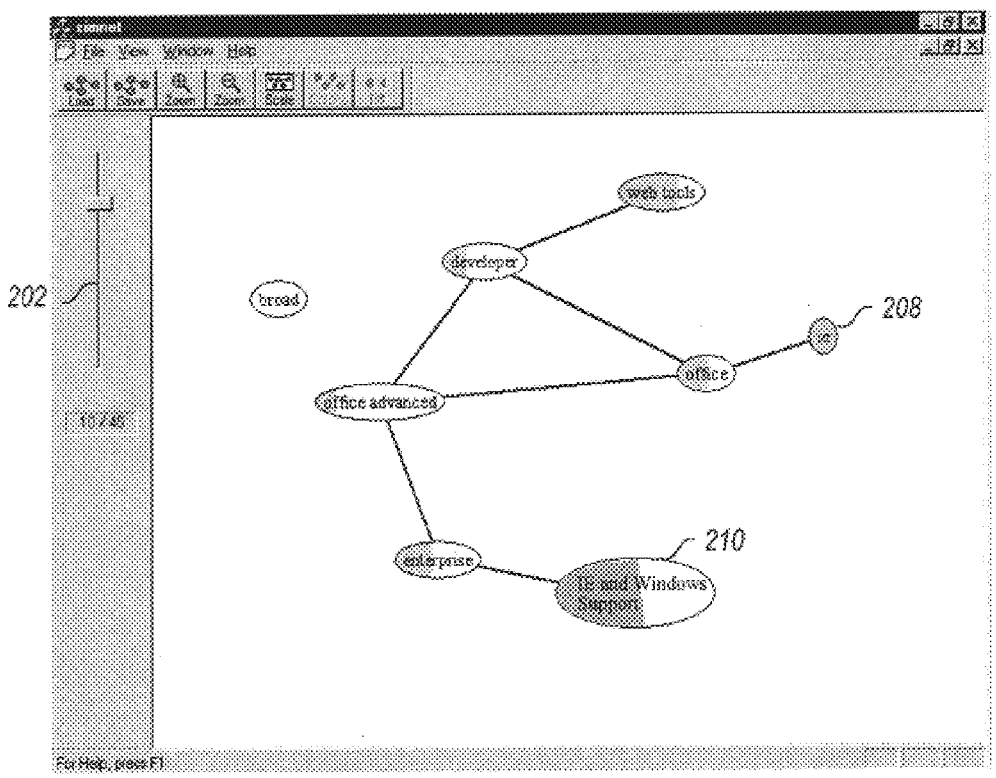

The CV system allows the data analyst to control the combining and splitting of categories. In particular, the CV system allows the data analyst to combine categories that are most similar and to split categories that have been combined. The combining and splitting of categories allows the data analyst to focus on more or fewer categories as needed. FIG. 2E illustrates the combining of the most similar categories. The slider 202 may be used to control the combining and splitting of categories. As the user moves the slider up a notch, the CV system selects the two categories represented by displayed nodes that are most similar and combines those categories into a single category. The CV system then removes the node for each of the categories to be combined along with arcs connected to those categories and displays a new node representing the combined category. In this example, categories "ie support" and "windows support" are most similar. Therefore, nodes 203 and 204 and arcs connected to those nodes have been removed and node 210 representing the combined category "ie and windows support" has been added. As the user moves the slider down a notch, the CV system splits the categories that were last combined. Thus, when the slider is moved down a notch after being moved up a notch, then the CV system displays the same similarity graph that was displayed before the data analyst moved the slider. The CV system may animate combining and splitting of categories. That is, the CV system shows the two nodes representing categories to be combined moving towards each other to form a single node representing the combined categories. The CV system animates the splitting of nodes by showing the reverse process.

Figure 2F:
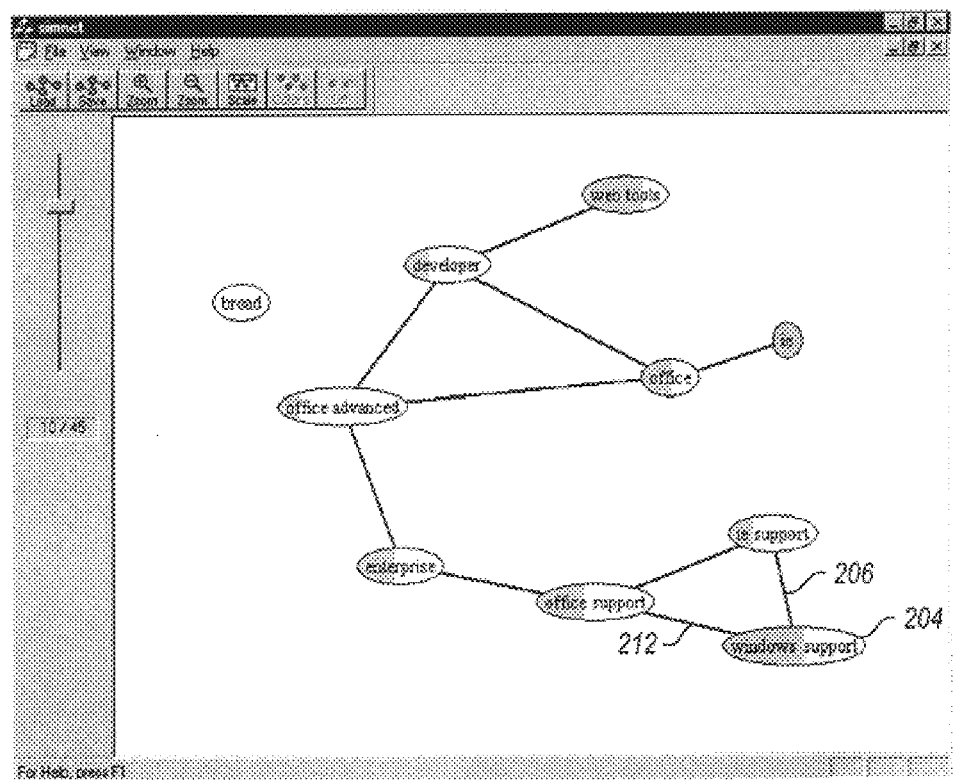

To further help a data analyst to focus on certain categories, the CV system allows a data analyst to de-emphasize a category. FIG. 2F illustrates the de-emphasizing of categories. When the data analyst specifies to de-emphasize a category, the CV system either removes the node representing that category and all connecting arcs from the similarity graph or displays that node and connecting arcs in a dimmed manner. For example, if the data analyst specifies to de-emphasize category "windows support," then the CV system removes node 204 representing category "windows support" and connecting arcs 206 and 212.

Figure 3A:
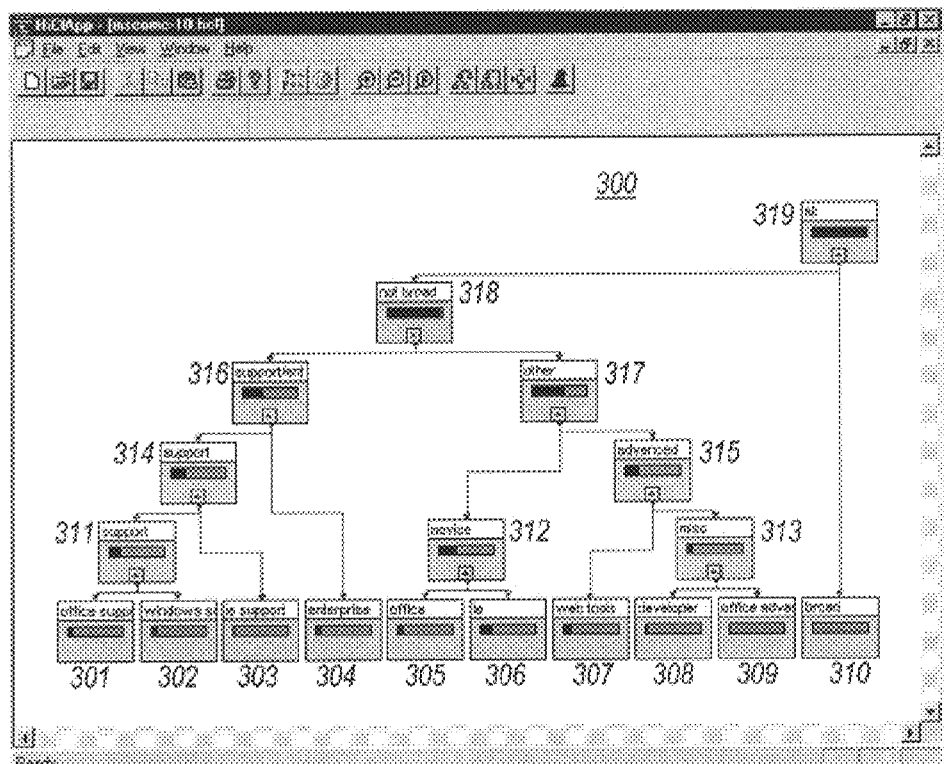
FIGS. 3A–3K illustrate example displays of a hierarchical map in a tree format and the support provided for traversing this map and examining it.
Figure 3B:
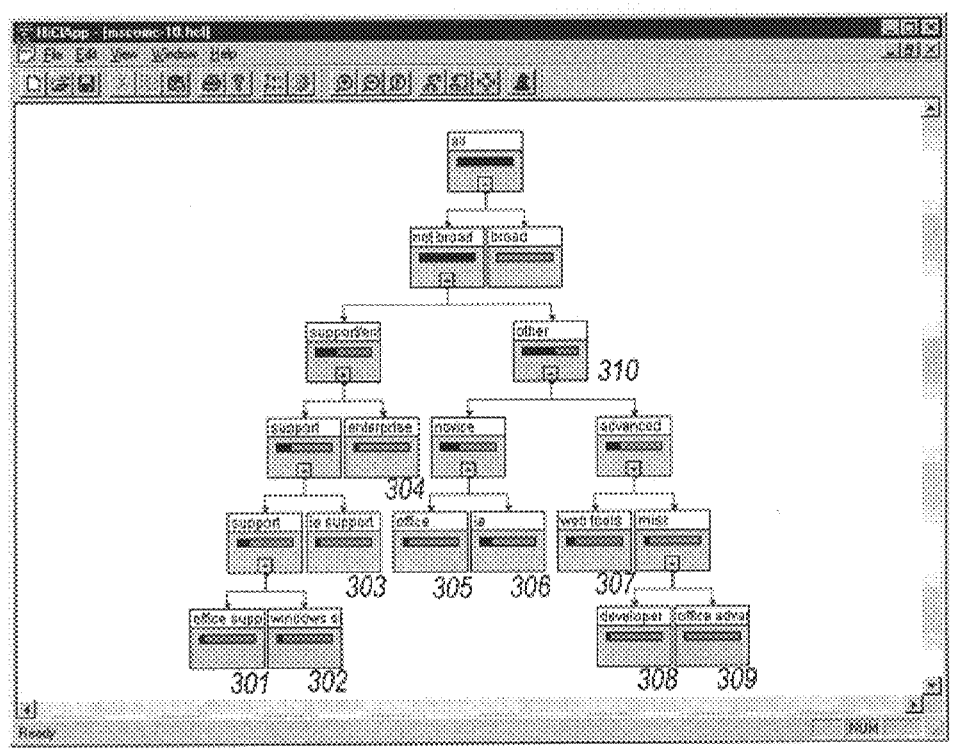

FIGS. 3A–3K and 4A–4B illustrate the display of a hierarchical map. The CV system creates a hierarchical map by starting with the base categories and successively combining the most similar categories to generate combined categories until a single combined category contains all the records of the collection. The construction of the hierarchy can be guided by an automated procedure (e.g., as described herein), by direct input from a user providing guidance as to which nodes should be merged or split next, or by a combination of both using occasional user interaction. The hierarchical map can be displayed in either tree format or circular format. With tree format selected, the CV system displays the hierarchical map in a standard tree data structure layout with the root node at the top of the display and the leaf nodes at the bottom of the display. Alternatively, the CV system may display the tree data structure upside-down with the root node at the bottom of the display and leaf nodes at the top of the display or sideways with the root node at one side of the display and the leaf nodes at the other side of the display. With circular format selected, the CV system displays the hierarchical map in a circular layout with the leaf nodes at the perimeter of a circle and the root node at the center. FIGS. 3A–3K illustrate the display of a hierarchical map in a tree format. FIG. 3A illustrates the display of a hierarchical map in the tree format with leaf nodes horizontally aligned. The hierarchical map 300 contains a leaf node 301–310 for each base category. The non-leaf nodes represent combined categories. For example, node 311 represents a combined category "support" that is a combination of category "office support" and category "windows support." Thus, the category represented by node 311 contains the records of the categories "office support" and "windows support." The root node 319 of the hierarchical map represents a category that contains all the records in the collection. In FIG. 3A, all the leaf nodes are displayed horizontally aligned. In contrast, FIG. 3B illustrates a hierarchical map in which the leaf nodes are not horizontally aligned. The CV system allows a data analyst to select whether to display the leaf nodes horizontally aligned. When the leaf nodes are horizontally aligned, it may be easier for the data analyst to visually identify the base categories. However, it may be more difficult for the data analyst to identify the sub-categories of a combined category.

Figure 3C:
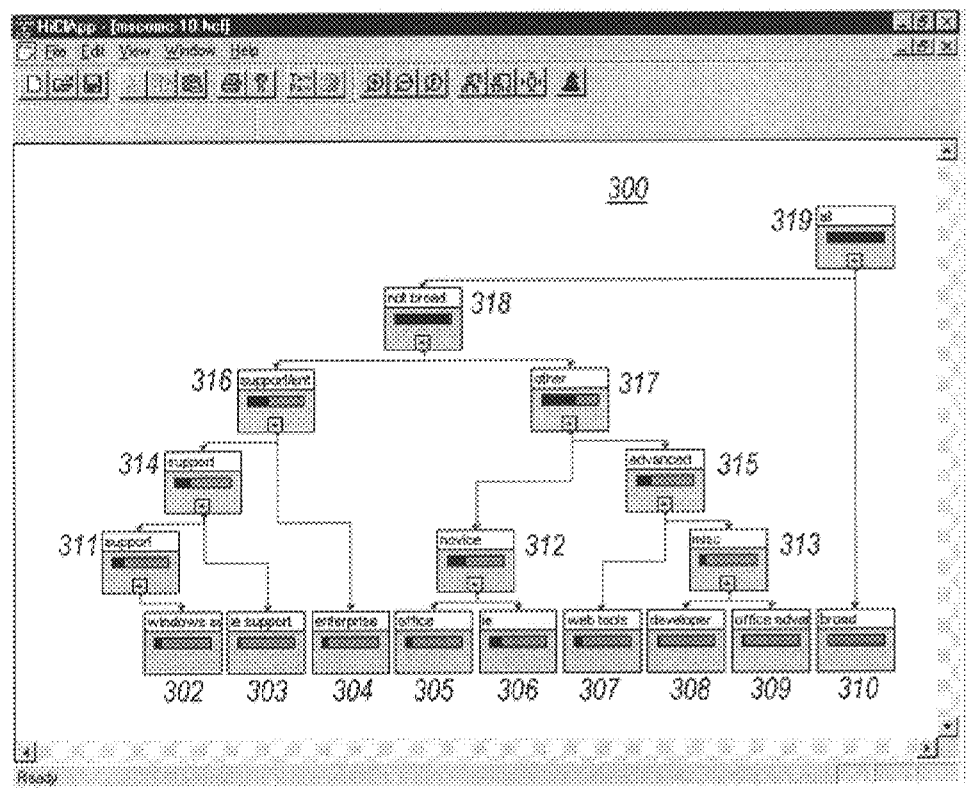
Figure 3D:
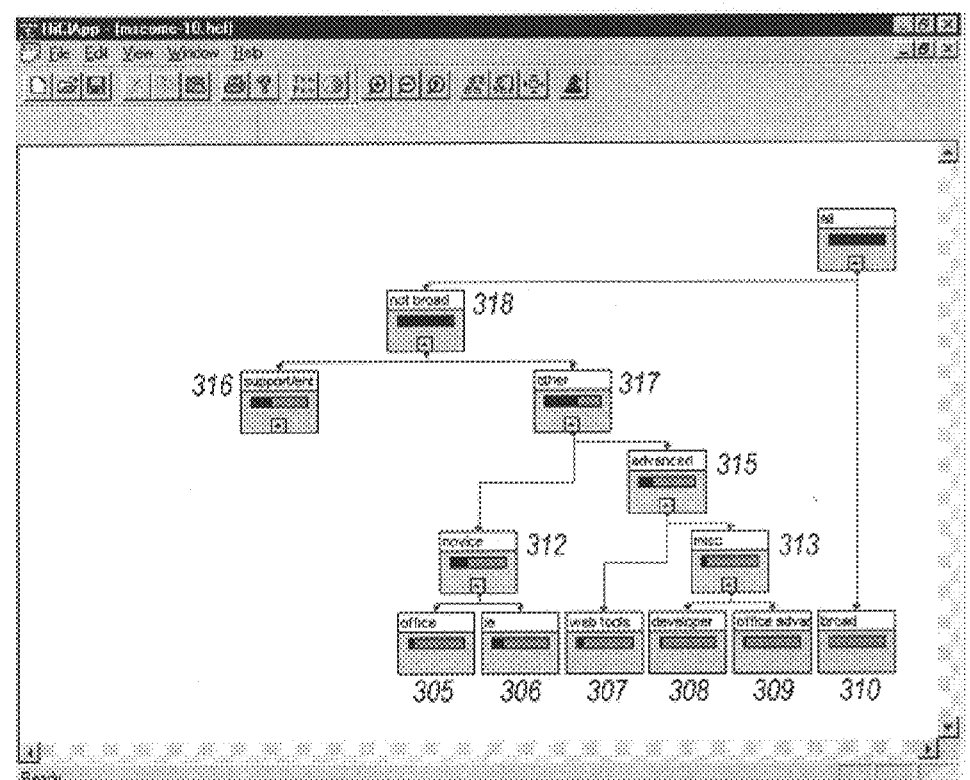

Many of the user interface features of the similarity network have analogous features in the hierarchical map. For example, FIG. 3C illustrates the de-emphasizing of a base category. In this example, the data analyst has selected to de-emphasize the node 301 representing base category "office support." The CV system de-emphasizes the node 301 by dimming or removing it. FIG. 3D illustrates the de-emphasizing of a combined category. In this example, the data analyst has selected to de-emphasize node 316 representing the combined category "support/enterprise." The data analyst can select to de-emphasize both the selected node and all its descendent nodes (i.e., the subtree with the selected node as its root) or only the descendent nodes. If a data analyst selects to de-emphasize a subtree, then the CV system can represent the subtree as a single node or can dim or remove the subtree.

Figure 3E:
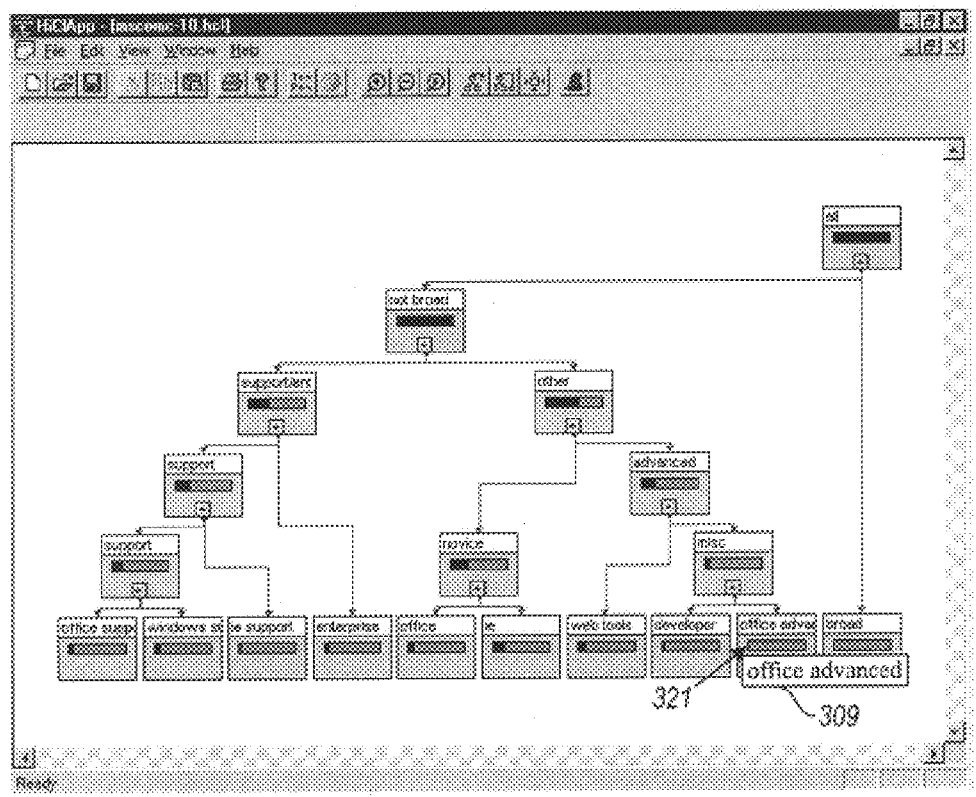
Figure 3F:
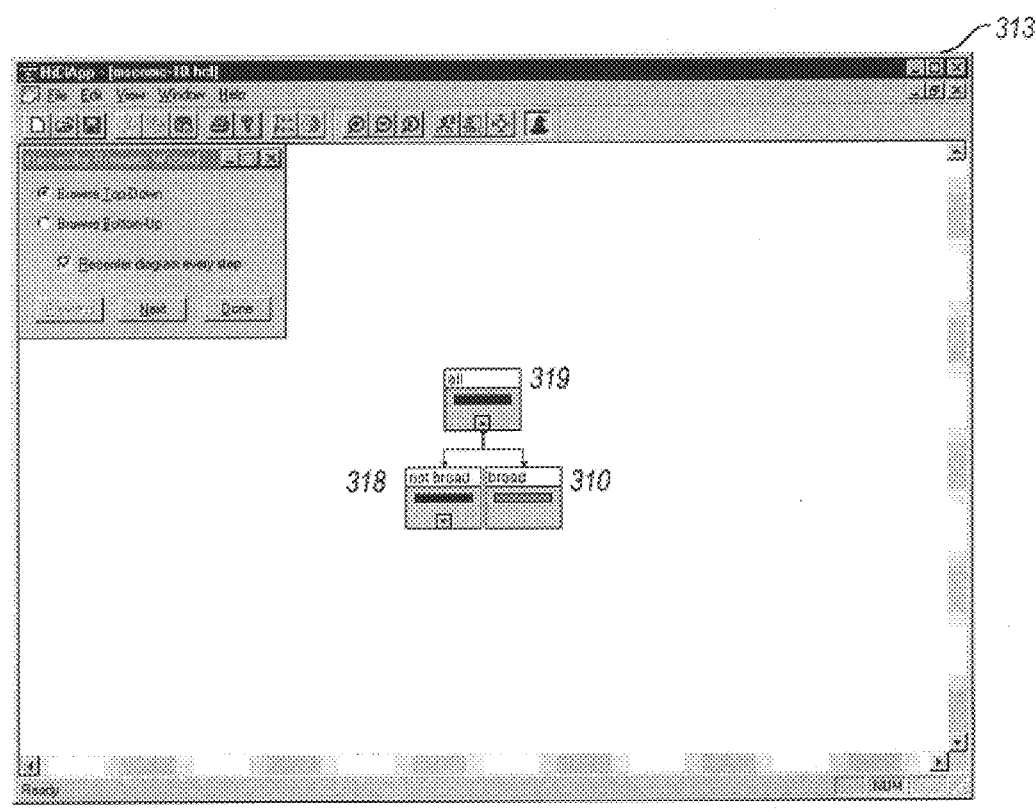

When a data analyst moves a cursor over the nodes of a category graph, the CV system displays additional information for the node. FIG. 3E illustrates the movement of the cursor over a node of a hierarchical map. In this example, the data analyst has moved a cursor over the node 309 representing category "office advanced." In this example, the complete name of the category is displayed. Alternatively, additional information about the node could be displayed, such as the number of records in the category.

The CV system allows a data analyst to browse through a hierarchical map in either a top-down or bottom-up manner. The browsing displays the base categories and combined categories based on similarity. When browsing from the bottom up, the CV system displays nodes representing combined categories (along with child nodes) in the same order as combined categories where generated when the hierarchical map was created. When browsing from the top down, the CV system displays the nodes representing combined categories in the reverse order. When browsing in a top-down manner, the CV system first displays the root node and its two child nodes because the root node represents the combined category that was generated last. The CV system displays "next" and "previous" buttons for browsing down and up the hierarchy nodes. Alternatively, the CV system provides a slider that allows the data analyst to move forward ("next") and backward ("previous") for browsing up and down the hierarchy of nodes. In response to the data analyst selecting the "next" button, the CV system displays the child nodes representing the sub-categories of the displayed node representing the combined category in reverse order in which the combined categories were generated. Also, in response to a data analyst selection of the "previous" button, the CV system removes the last child nodes displayed. When browsing in a bottom-up manner, the CV system first displays the node (and its child nodes) representing the combined category that was generated first. In response to the data analyst selection of "next node," the CV system displays the node (and child nodes if not already displayed) representing the combined category that was next generated. Also, in response to a data analyst selection of the "previous" button, the CV system removes the node(s) displayed most recently. The CV system supports browsing a hierarchical map that is displayed in either tree or circular format.

Figure 3G:
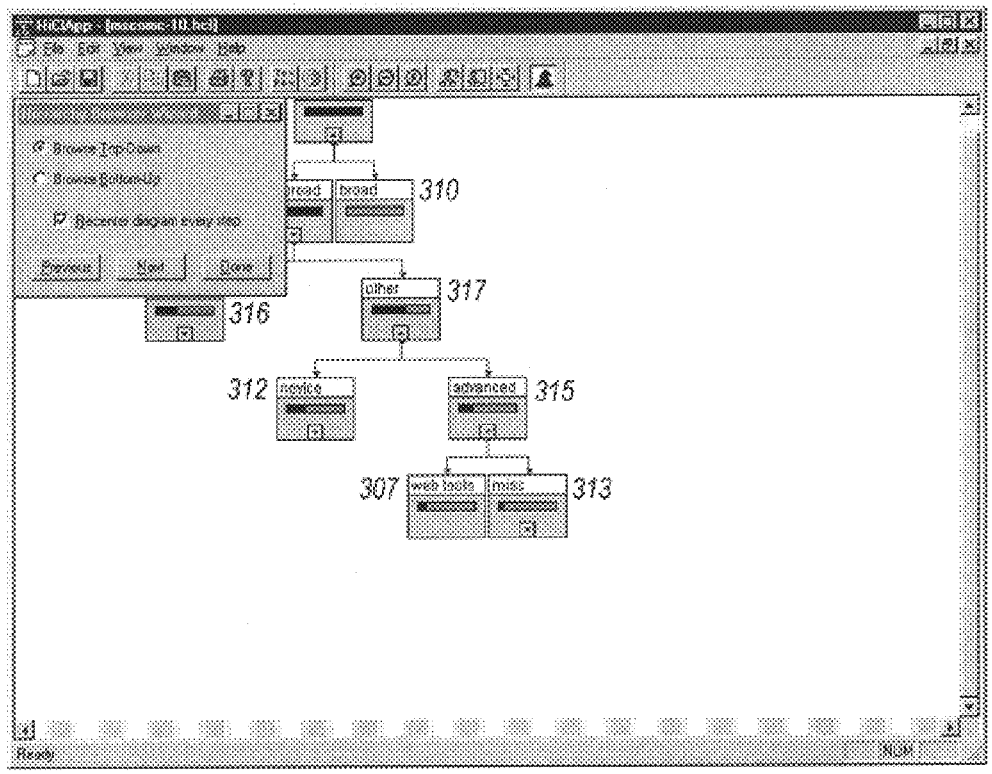

FIGS. 3F–3K illustrate the browsing features of the CV system. The browsing features allow the user to incrementally display the hierarchical map in either a top-down or a bottom-up manner. When the user selects a top-down browse, the root node 319 and its two child nodes 310 and 318 are displayed initially. At each request to browse down, additional child nodes are displayed in the reverse order in which the child nodes were combined to generate combined categories. As shown in FIG. 3G, as the data analyst first requests to browse down, the CV system displays node 316 representing the combined category "support/enterprise" and node 317 representing category "other." When the data analyst next requests to browse down, the CV system displays node 312 representing category "novice" and node 315 representing category "advanced," which are child nodes of node 317 representing category "other." When the data analyst then requests to browse down, the CV system displays nodes 307 representing category "web tools" and node 313 representing category "miscellaneous," which are child nodes of node 315 representing category "advanced." In this example, the data analyst has selected to recenter the node that is being browsed down in the center of the display. Thus, node 315 is shown in the center of the display.

Figure 3H:
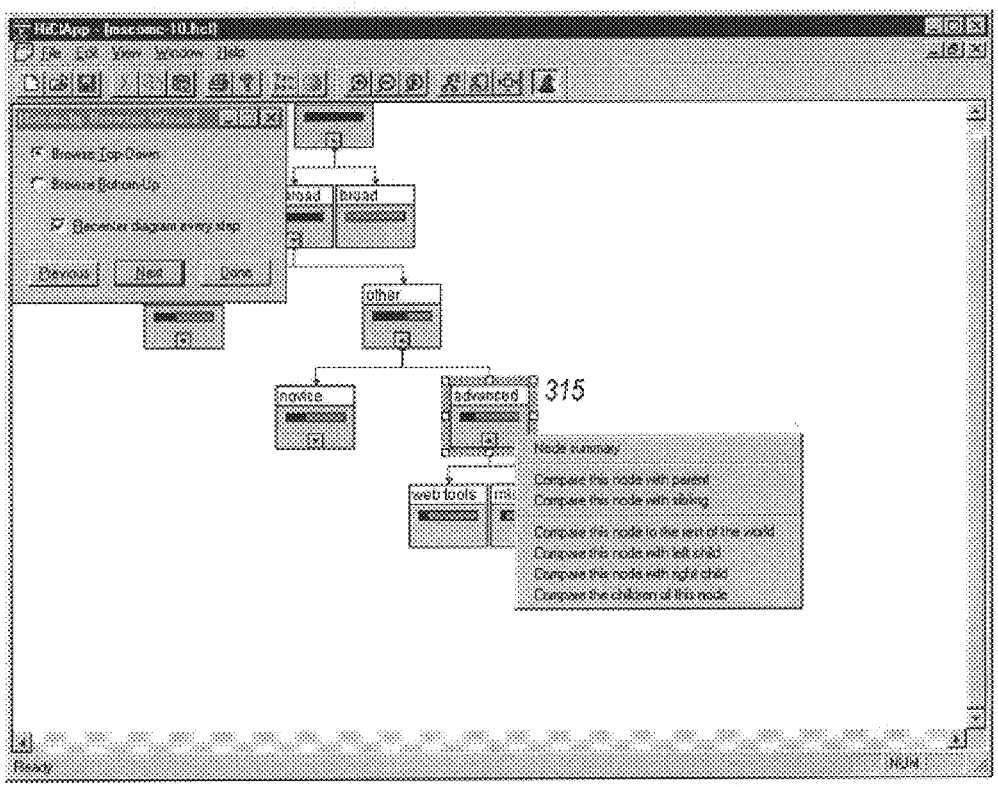

When in browsing mode, the data analyst may select a node to display a list of various options for displaying information relating to the nodes. FIG. 3H illustrates the list of options for a selected node. In this example, the data analyst has selected node 315 representing category "advanced." When the node is selected, the CV system displays a pop-up window indicating the various options that may be selected by the user. Table 2 lists the options.

TABLE 2

| Node summary |
| --- |
| Compare this node with parent |
| Compare this node with sibling |
| Compare this node to rest of the world |
| Compare this node with left child |
| Compare this node with right child |
| Compare the children of this node |

A "node summary" includes more detailed information about the category that the node represents. For example, the node summary may include the number of records in the category and the percentage of the records that have various attribute values, which is referred to as characteristic information. The "compare" options display similarity and discriminating information between the selected category and other categories. The discriminating information indicates which attributes distinguish the record in the selected category from records in other categories.

Figure 3I:
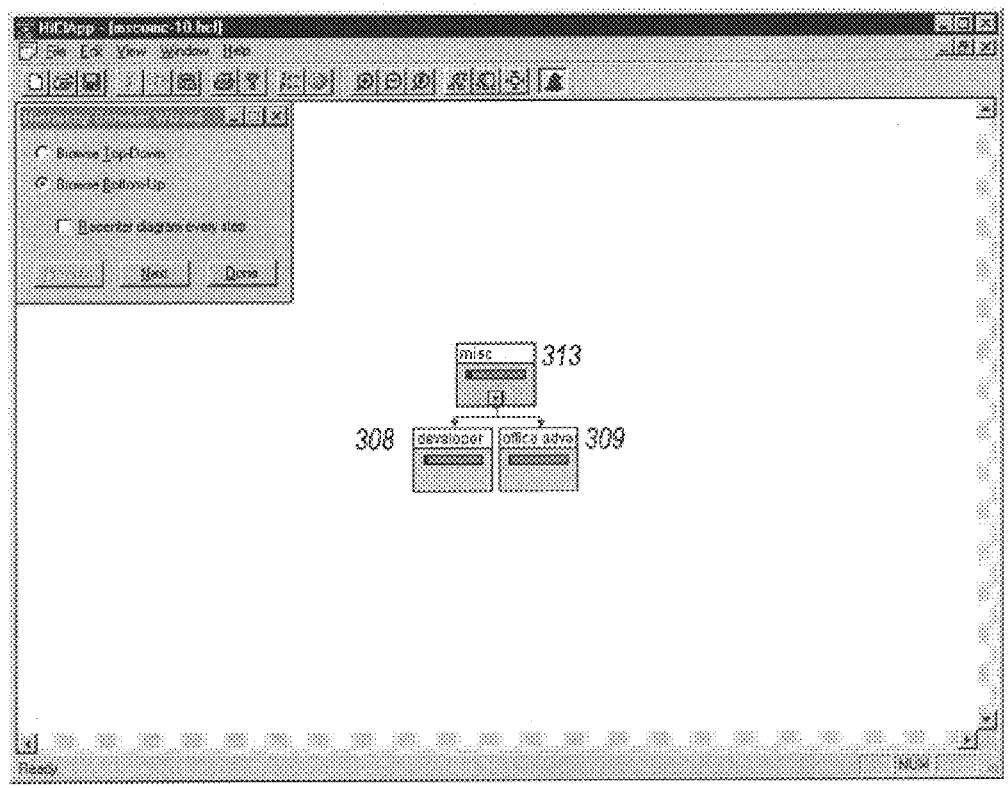
Figure 3J:
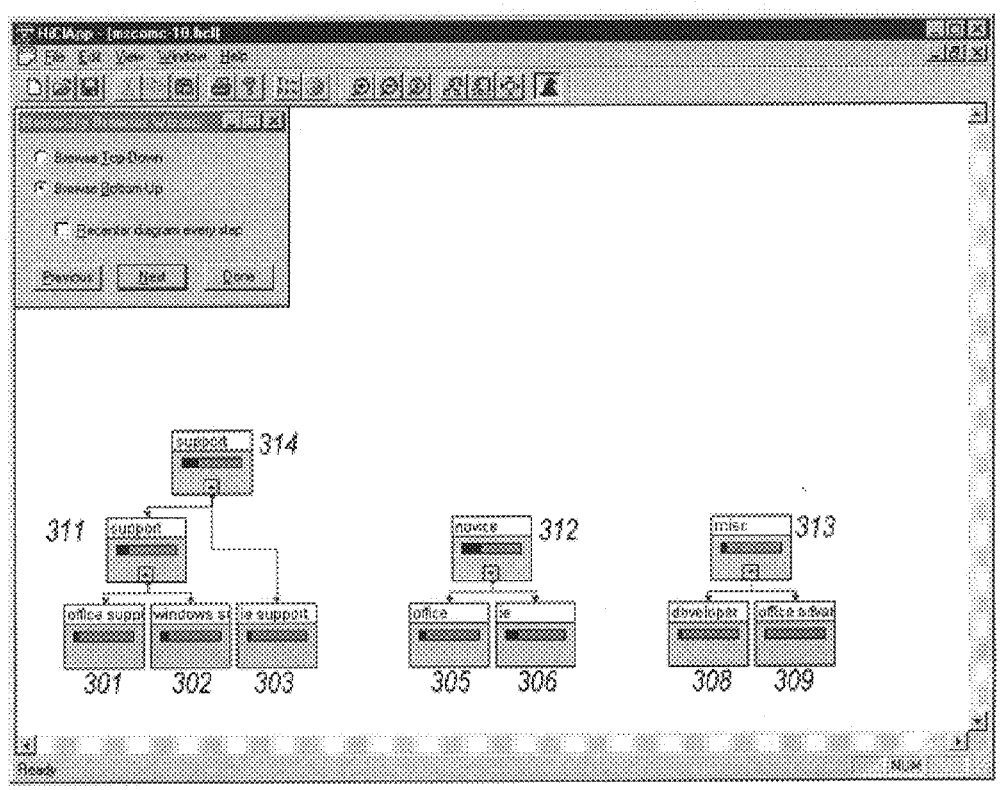
Figure 3K:
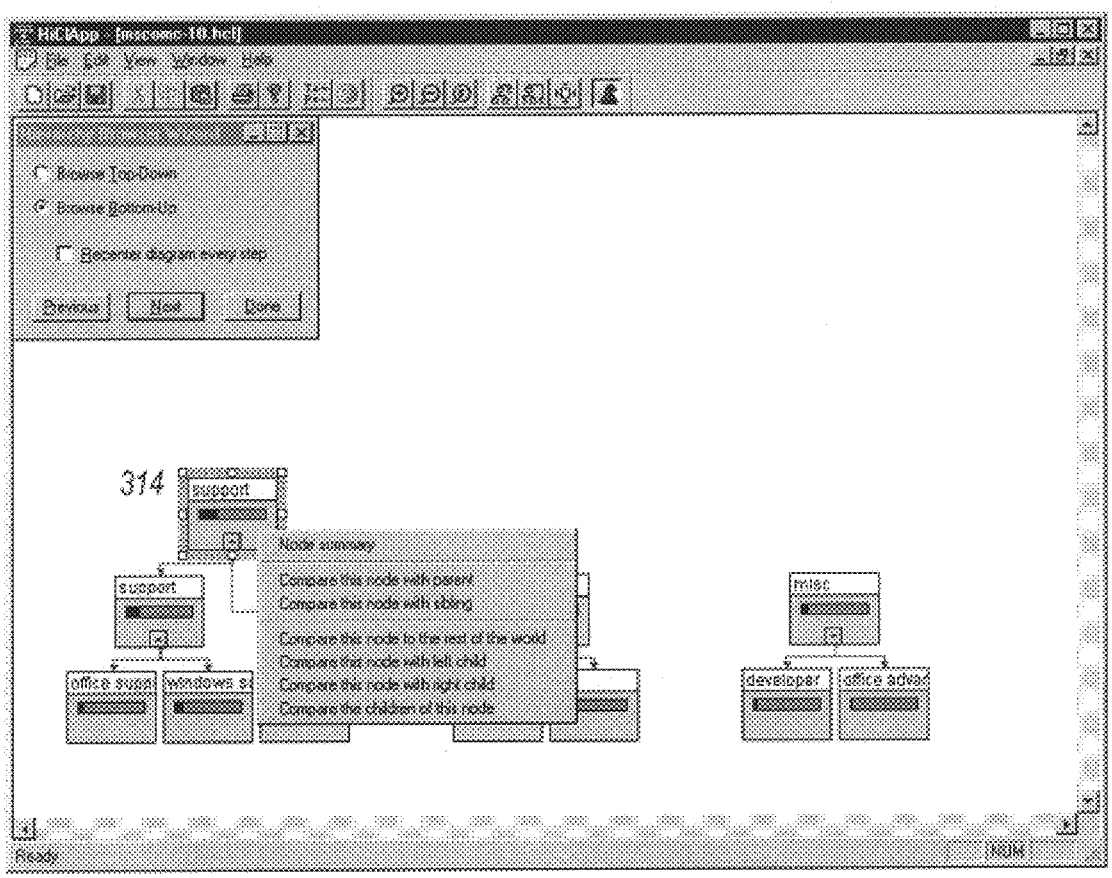

FIGS. 3I–3K illustrate browsing in a bottom-up manner. FIG. 3I illustrates the initial display in a bottom-up browse.

In this example, node 313 representing combined category "miscellaneous" is displayed along with its child node 308 representing category "developer" and child node 309 representing category "office advanced" because the combined category "miscellaneous" was the first combined category generated when generating the hierarchical map. Each time the user selects the "next" button an additional combined category is displayed in the order that the combined categories were generated. FIG. 3J illustrates the display of the hierarchical map after the user has selected the "next" button three times. When the data analyst selects "next" button the first time, then the CV system displays node 311 representing the "support" category plus its child node 301 representing category "office support" and child node 302 representing category "windows support." When the data analyst selects the "next" button for the second time, then the CV system displays node 312 representing category "novice" and its child node 305 representing category "office" and child node 306 representing category "ie." When the data analyst selects the "next" button for the third time, the CV system displays node 314 representing category "support" along with its child node 303 representing the category "ie support." The other child node 311 representing combined category "support" is already displayed. FIG. 3K illustrates the selection of node 314 representing the category "support." The data analyst may also use a slider to browse the hierarchy up or down rather than use the "previous" and "next" buttons. The CV system can also animate the browsing of the hierarchical maps. When animating the browsing in a bottom-up manner, the CV system progressively displays the nodes from the bottom of the hierarchy towards the top at, for example, periodic time intervals. When animating browsing in a top-down manner, the CV system displays the root node first and then displays additional nodes periodically until the leaf nodes are displayed.

Figure 4:
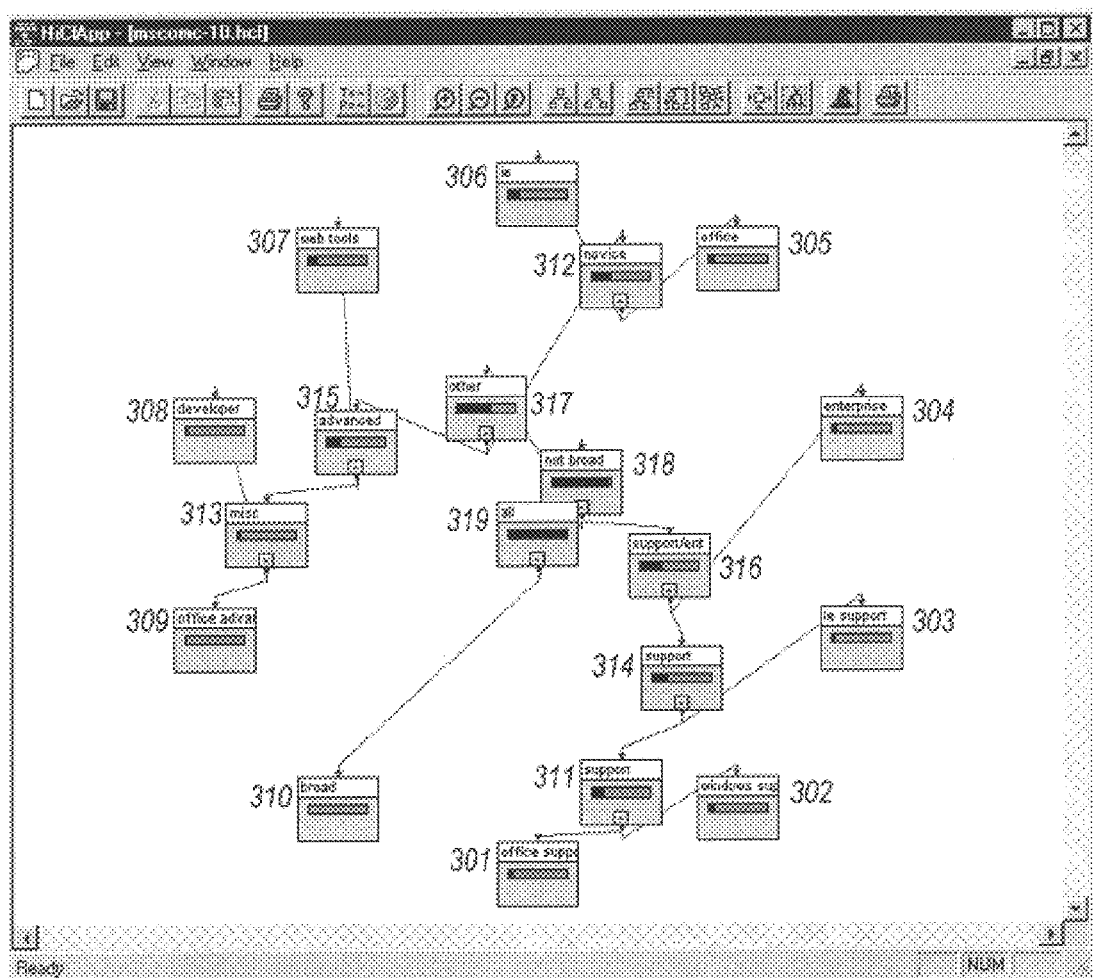
FIG. 4 illustrates an example display of a hierarchical map in a circular format.

FIG. 4 illustrates a hierarchical map displayed in circular format. The leaf nodes of the hierarchy are displayed in a circle. In the center of the circle is displayed the root node of the hierarchy. The other non-leaf nodes are displayed between the root node and the surrounding leaf nodes. The same visualization features (e.g., browsing and de-emphasizing) that are used with the tree format can be used with the circular format of the hierarchical map. Also, similarity information can be displayed along with a hierarchical map by, for example, using different color arcs to connect nodes representing the base categories. Thus, a similarity graph is effectively superimposed on a hierarchical map.

Figure 5A:
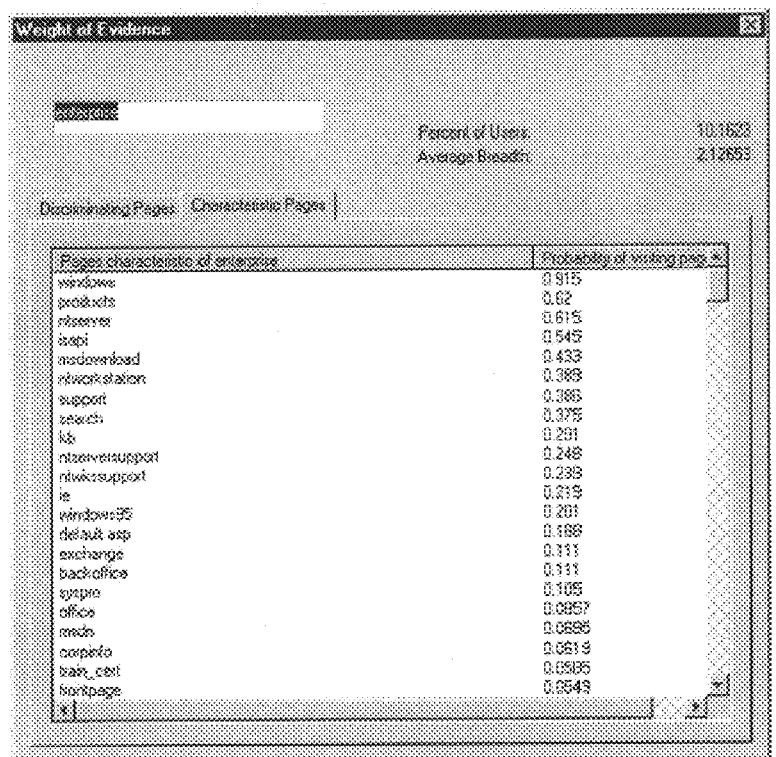
FIG. 5A illustrates characteristics pages of a category of users of web pages.
Figure 5B:
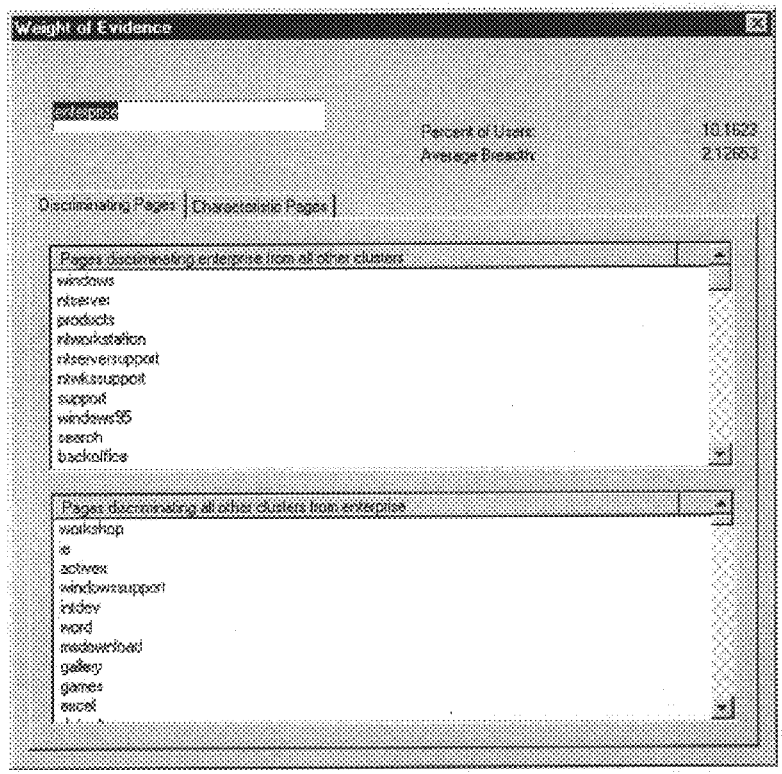
FIG. 5B illustrates discriminating pages for a category of users of web pages.
Figure 5C:
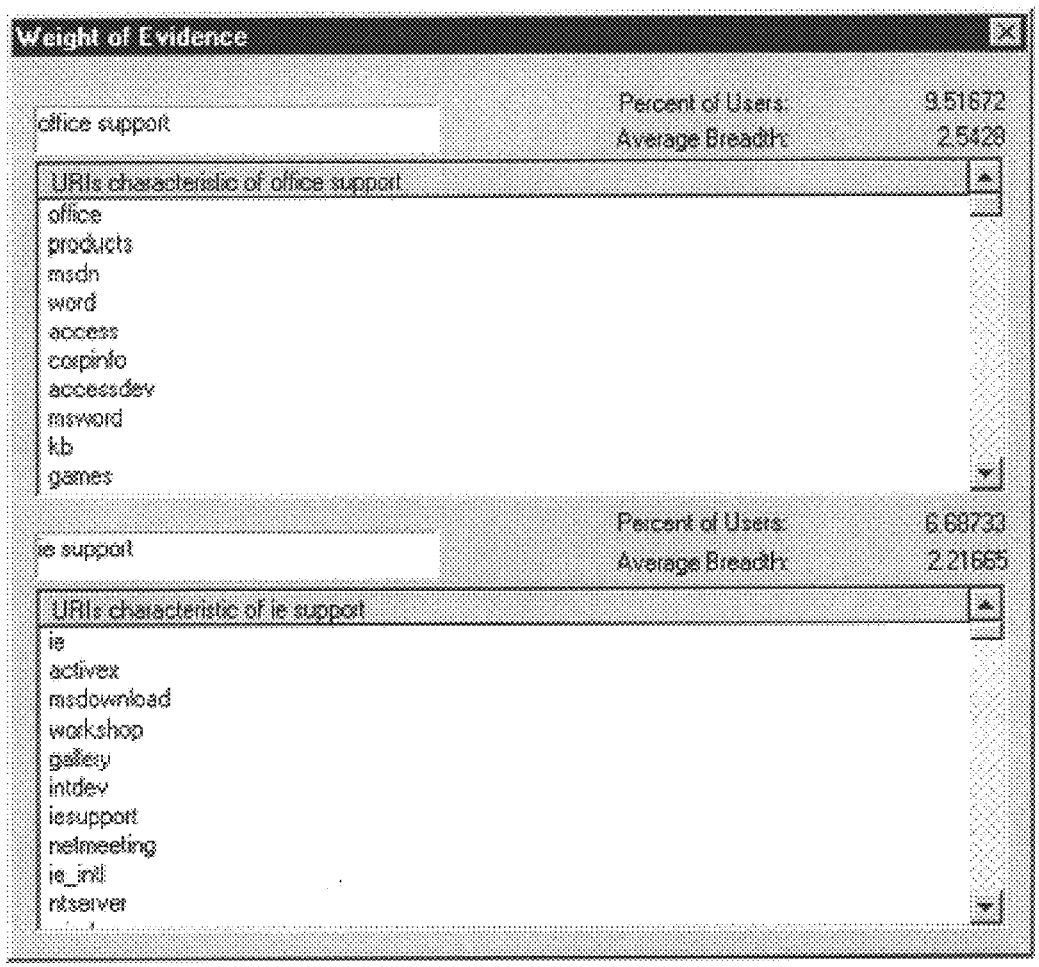
FIG. 5C illustrates pairwise discrimination for two categories of users of web pages.

The CV system displays additional information about categories when requested by a data analyst. This additional information includes characteristic and discriminating information. FIGS. 5A–5C illustrate weights of evidence information that may be displayed when a data analyst selects a node of a category graph. The weights of evidence information includes the identification of discriminating pages and characteristic pages. FIG. 5A illustrates the display of the characteristics pages of category "enterprise." The characteristic pages lists the web pages that are accessed by the users in a category in order based on the probability that a user in the category accesses the web page. The probability is equal to the number of users in the category who access the web page divided by the number of users in the category. The characteristic pages of category "enterprise" indicates that a user in that category has 0.915 probability of accessing the "windows" web page. Also, a user in that category has a 0.62 probability of accessing the "products" web page.

FIG. 5B illustrates the discriminating pages for the category "enterprise." The top panel illustrates the web pages that discriminate the category "enterprise" from all other categories. The web pages are listed in order based on their ability to discriminate all other categories. Web pages tend to be accessed by the users of a category and not accessed by users of the other categories tend to be most discriminating. In this example, the "windows" web page, the "ntserver" web page, the "products" web page, and so on serve to discriminate users in category "enterprise" from all others. The bottom panel indicates the web pages that discriminate all other categories from "enterprise" category. Web pages accessed by users of the other categories and not accessed by users of a selected category tend to be most discriminating. In this example, the "workshop" web page, the "ie" web page, and so on are used to discriminate all of the categories from the category "enterprise." An example mathematical basis for discrimination is provided below.

FIG. 5C illustrates the display of pairwise discrimination for two categories. In this example, the user has selected to display information that tends to discriminate category "office support" from category "ie support." As shown by the top panel, the users of the category "office support" tend to use the "office" web page, whereas users of category "ie support" tend not to use the "office" web page. In contrast, the users of the category "ie support" tend to use the "ie" web page, whereas users of category "office support" tend not to use that web page.

Figure 6A:
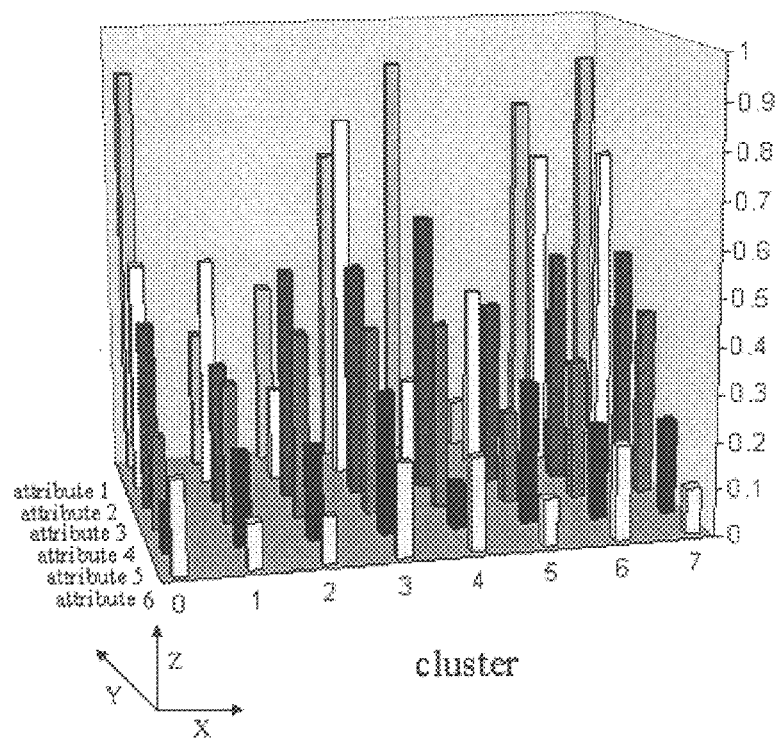
FIGS. 6A–6B illustrate a 3-D graph of the probability that each attribute equals 1 for binary attributes for various clusters.
Figure 6B:
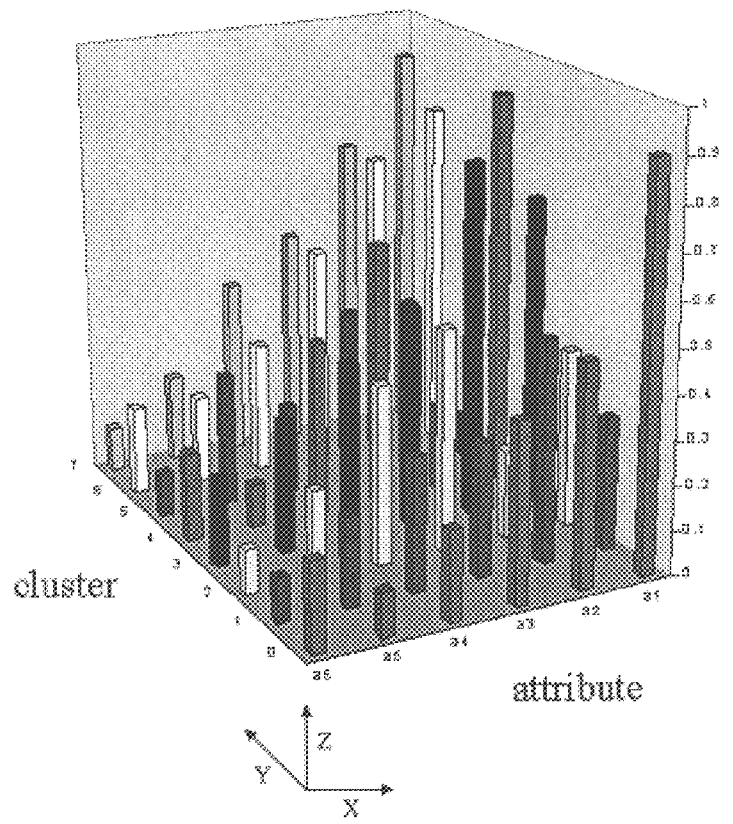

The CV system provides for displaying certain information in a 3-D graphical form. FIG. 6A illustrates a 3-D graph of the probability that each attribute equals 1 for each binary attribute. The x-axis represents the categories, the y-axis represents the attributes, and the z-axis represents the probabilities. For example, the height of bar 601 represents the probability (of approximately 0.1) that a record in category 1 will have a value of 1. In this example, the bars for a given attribute are shown in the same color or shade. FIG. 6B illustrates a 3-D graph of the same information as the graph of FIG. 6A except that the bars for a given category, rather than a given attribute, are shown in the same color or shade. These graphs therefore allow a data analyst to focus on attributes or categories.

Figure 7:
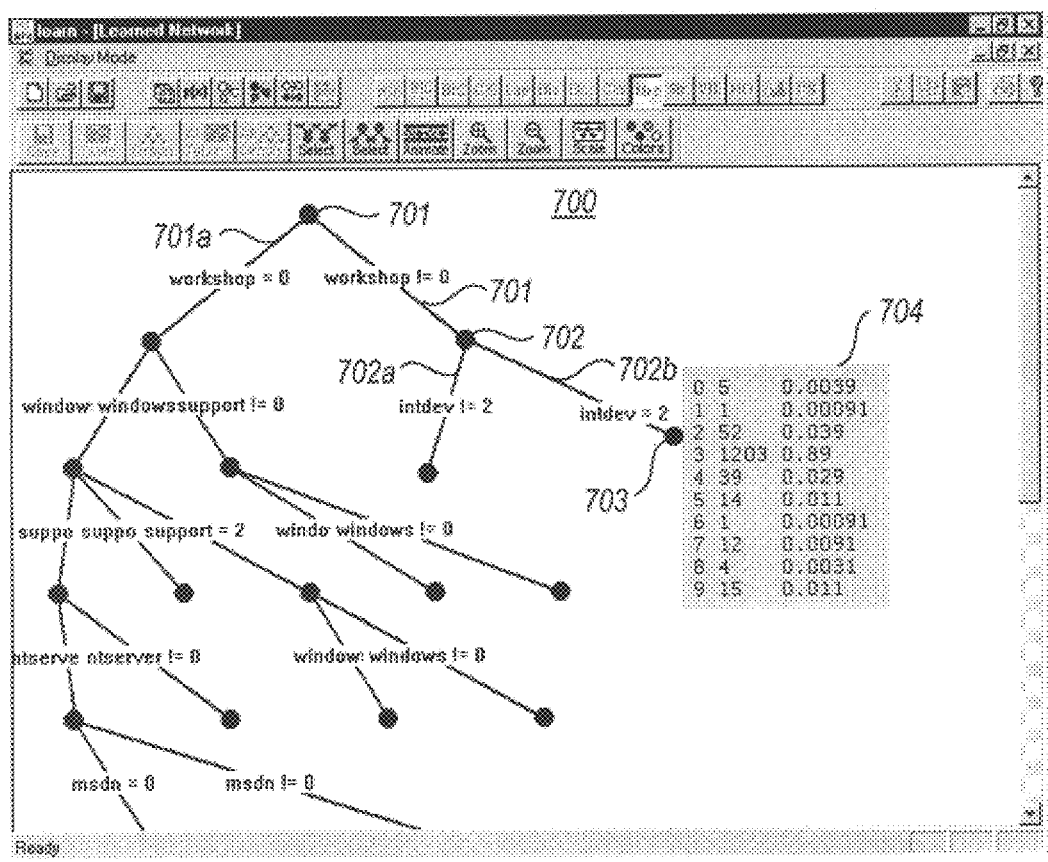
FIG. 7 illustrates a decision tree format for displaying the categories of a collection.

The CV system also provides for displaying categories in a decision tree format. FIG. 7 illustrates a decision tree format for displaying the categories of a collection. The decision tree 700 contains nodes corresponding to attributes and arcs corresponding to values of that attribute. The decision tree has node 701 corresponding to the attribute indicating whether a user accessed the "workshop" web page and arcs 701*a* and 701*b* indicating the values of zero and non-zero for that attribute. Node 702 corresponds to the attribute indicating whether a user accessed the "intdev" web page and arcs 702*a* and 702*b* indicating the values of 2 and not 2. Thus, each node, except the root node, represents a setting of attribute values as indicated by the arcs in the path from that node to the root node. When a data analyst selects a node, the CV system displays a probability for each category that a record in that category will have the attribute settings that are represented by the path. For example, when the data analyst selects node 703 representing the attribute setting of accessing the "workshop" web page at least once and accessing the "intdev" web page twice, the CV system displays table 704. The table identifies the categories, the number of records in each category that match those attribute settings, and the probabilities. For example, the first line "0 5 0.0039" indicates that category 0 has 5 records that match the attribute settings and that the probability for category 0 is 0.0039. The CV system generates the decision tree by adding a column to a collection of records that contains the category of record. The CV system then applies a decision tree algorithm (e.g., Chickering, D., Heckerman, D., Meek, C., "A Bayesian Approach to Learning Bayesian Networks with Local Structure," *Proceedings of the Thirteenth Conference on Uncertainty in Artificial Intelligence*, 1997) to build a decision tree (or graph) in which the category column represents the target variable.

Mathematical Basis

The similarity in one embodiment corresponds to the "distance" between the records in two categories. A mathematical basis for a distance calculation is presented in the following. In the following, $X_1, \ldots, X_m$ refers to the variables representing the attributes and $x_1, \ldots, x_m$ refers to the state of a variable, that is, the attribute values. First, however, various probabilities are defined that are used to calculate the distance. The probability of a record in a collection having attribute values $x_1, \ldots, x_m$ is represented by the joint probability density function of the following equation:

$$p(x_1, \ldots, x_m) = \sum_j p(h_j) p(x_1, \ldots, x_m | h_j) \qquad (1a)$$

where $h_j$ represents category j, where $p(h_j)$ represents the probability that any record is in category j, and where $p(x_1, \ldots, x_m | h_j)$ represents the conditional probability that a record has attribute values $x_1, \ldots, x_m$ given that it is a record from category j. The probability that a record is in category j is given by the following equation:

$$p(h_j) = \frac{size(h_j) + \alpha_j}{\sum_j size(h_j) + \alpha_j} \qquad (1b)$$

where $size(h_j)$ is a count of the number of records in category j, and the $\alpha_j$ are hyperparameters (e.g., $\alpha_j=1$ for all j). For example, if category j contains 10,000 records and the collection contains 100,000 records, then $p(h_j)=0.1$.

In one embodiment, it is assumed that the probability that a record with attribute values $x_1, \ldots, x_m$ is in category j is the product of the probabilities for each attribute value that a record in category j has that attribute value and is given by the following equation:

$$p(x_1, \ldots, x_m | h_j) = \prod_i p(x_i | h_j) \qquad (1c)$$

where $p(x_i|h_j)$ is the conditional probability that a record has the attribute value $x_i$ for attribute i given that it is in category j. This probability is given by the following equation:

$$p(x_i | h_j) = \frac{size(x_i, h_j) + \alpha_{ij}}{\sum_{y_i} size(y_i, h_j) + \alpha_{ij}} \qquad (1d)$$

where $size(x_i, h_j)$ is the number of records in category j with a value for attribute i that equals the attribute value $x_i$, where the summation is overall values of attribute i and where $\alpha_{ij}$ are hyperparameters (e.g., $\alpha_{ij}=1$, for all i and j). For example, if category j contains 10,000 records and 100 of those records have a value of 1 for attribute i, then $p(1|h_j)=0.01$. Equation (1a) can be rewritten by substituting Equation (1c) as the following equation:

$$p(x_1, \ldots, x_m) = \sum_j p(h_j) \prod_i p(x_i | h_j) \qquad (1e)$$

In one embodiment, the similarity, also known as distance, between two categories is given by the sum of the Kullback-Leibler (KL) distance between the records in the first category and the records in the second category and the KL distance between the records in the second category and the records in the first category. The distance is given by the symmetric divergence (H. Jefferys, *Theory of Probability*, Oxford University Press, 1939):

$$dist(h_1, h_2) = KL(p(X_1, \ldots, X_m | h_1), p(X_1, \ldots, X_m | h_2)) + KL(p(X_1, \ldots X_m | h_2), p(X_1, \ldots, X_m | h_1)) \qquad (2a)$$

Equation (2a) reduces to the following equation:

$$dist(h_1, h_2) = \sum_{x_1, \ldots, x_m} (p(x_1, \ldots, x_m | h_1) - p(x_1, \ldots, x_m | h_2)) \log \frac{p(x_1, \ldots, x_m | h_1)}{p(x_1, \ldots, x_m | h_2)} \qquad (2b)$$

Thus, the distance between the first and second categories is the sum for all possible combinations of attribute values of a first probability that a record with that combination of attribute values is in the first category minus a second probability that a record with that combination of attribute values is in the second category times the logarithm of the first probability divided by the second probability. Since Equation (2b) requires a summation over all possible combinations of attribute values, the determination of the similarity using this formula is computationally expensive. When Equation (1c) is substituted into Equation (2d), the result is the following equation:

$$dist(h_1, h_2) = \sum_i \sum_{x_i} (p(x_i | h_1) - p(x_i | h_2)) \log \frac{p(x_i | h_1)}{p(x_i | h_2)} \qquad (2c)$$

This equation requires only the summation over all possible values of each attribute, and not over all possible combinations of attributes, and is thus computationally much more efficient.

Equation (2c) or, alternatively, Equation (2b) provides a way to calculate the similarity for a pair of base categories. Several different equations can be used to calculate the similarity between two combined categories. For example, when two categories are combined into a combined category, then the similarity between the combined category and every other category (combined or not combined) needs to be calculated for the display of a similarity graph. Equations (3a), (3b), and (3c) provide three different techniques for calculating the similarities with combined categories. The first technique averages the similarity between each pair of categories of the first and second combined categories and is given by the following equation:

$$dist(G_1, G_2) = \sum_{h_j \in G_1, h_k \in G_2} p(h_j) p(h_k) dist(h_j, h_k) \qquad (3a)$$

where $G_1$ represents the first combined category and $G_2$ represents the second combined category. Thus, the distance is the summation of the distances between each pair of categories times the probabilities (Equation (1b)) that a record is in each of the categories. The second and third techniques calculate the distance as either the minimum or maximum distance between any two pairs of categories in the first and second combined categories and are given by the following equations:

$$dist(G_1, G_2) = \min\{dist(h_j, h_k) | h_j \in G_1, h_k \in G_2\} \quad (3b)$$

$$dist(G_1, G_2) = \max\{dist(h_j, h_k) | h_j \in G_1, h_k \in G_2\} \quad (3c)$$

Another technique for calculating the distance is by treating a combined category as a non-combined category with the records of the sub-categories. This technique results in the following equation:

$$dist(G_1, G_2) = \sum_{x_1,\ldots,x_m} (p(x_1,\ldots,x_m|G_1) - p(x_1,\ldots,x_m|G_2))\log\frac{p(x_1,\ldots,x_m|G_1)}{p(x_1,\ldots,x_m|G_2)} \quad (4a)$$

where $p(x_1, \ldots, x_m|G)$ is the conditional probability that a record has attribute values $x_1, \ldots, x_m$ given that it is a record from the combined category G. This probability is given by the following equation:

$$p(x_1,\ldots,x_m|G) = \frac{\sum_{h_j \in G} p(h_j)p(x_1,\ldots,x_m|h_j)}{\sum_{h_j \in G} p(h_j)} \quad (4b)$$

where the denominator is the sum of the probabilities that any record is in each category G and the numerator is the sum for each category j in G of the probability that the record with attribute values $x_1, \ldots, x_m$ is in category j times the probability that a record in the collection is in category j. Equation (4a), however, cannot be factored in the same way as Equation (2b), and thus the determination of the distance between combined categories $G_1$ and $G_2$ is computationally expensive because a summation over all possible combinations of attribute values is needed. For example, if there are 10 attributes with approximately 5 possible attribute values each, then there are approximately $10^7$ possible combinations of attribute values. Therefore, in one embodiment, the CV system approximates the distance using a Monte Carlo method such as simple sampling from $G_1$ and $G_2$ where $s_1, \ldots, s_r$ denote the samples from $G_1$, and where $t_1, \ldots, t_s$ denote the samples from $G_2$ (each $s_i$ and $t_i$ correspond to the observations $x_1, \ldots x_n$ for all attributes. (E.g., Shachter and Peot, "Simulation Approaches to General Probabalistic Inference in Belief Networks," *Uncertainty in Artificial Intelligence* 5, p. 221–231, 1990.) The CV system approximates the distance between two combined categories by taking the sample data sets and applying them to the following:

$$dist(G_1, G_2) = \sum_{h_j \in G_1, h_k \in G_2} p(h_j)p(h_k)dist(h_j, h_k) \quad (5a)$$

where $p(s_i|G_j)$ and $p(t_i|G_j)$ are computed using Equation (4b). The number of samples from $G_1$ and $G_2$ are taken in proportion to $p(G_1)$ and $p(G_2)$, where $p(G_j)$ is the probability that a record is in the set of categories defined by $G_j$.

This Monte Carlo method can be used to calculate the distance between both base and combined categories when Equation (2b) without the independence assumption is used as a distance.

Another technique for calculating the distance is to assume that the individual attributes are conditionally independent given $G_1$, $G_2$, and the set of clusters not in $G_1$ union $G_2$, yielding the formula $$dist(G_1, G_2) = \sum_i \sum_{x_i} (p(x_i|G_1) - p(x_i|G_2))\log\frac{p(x_i|G_1)}{p(x_i|G_2)} \quad (5b)$$

As discussed above, attribute-value discrimination refers to how well the value of an attribute distinguishes the records of one category from the records of another category. One technique for calculating attribute-value discrimination is given by the following formula:

$$discrim(x_i|G_1, G_2) = p(x_i|G_1) - p(x_i|G_2))\log\frac{p(x_i|G_1)}{p(x_i|G_2)} + \quad (6a)$$

$$(p(x_i|G_2) - p(x_i|G_1))\log\frac{1-p(x_i|G_1)}{1-p(x_i|G_2)}$$

where the probability that a record with a value of $x_i$ for attributes in combined category $G_1$ is given by the following equation:

$$p(x_i|G) = \frac{\sum_{h_j \in G} p(h_j) \prod_i p(x_i|h_j)}{\sum_{h_j \in G} p(h_j)} \quad (6b)$$

Attribute-value discrimination scores can be positive, negative, or zero. If the score $discrim(x_i|G_1,G_2)$ is positive, then the observation of the attribute value $x_i$ makes $G_1$ more likely than $G_2$. If the score $discrim(x_i|G_1,G_2)$ is negative, then the observation of the attribute-value $x_i$ makes $G_1$ less likely than $G_2$. If the score $discrim(x_i|G_1,G_2)$ is zero, then the observation of the attribute-value $x_i$ leaves the relative probabilities of $G_1$ and $G_2$ the same. The last case almost never occurs.

There are several possibilities for displaying the attribute values and their corresponding discrimination scores. In one embodiment, all attribute values are displayed such that (1) the attribute values with positive and negative scores appear in separate areas of the screen, and (2) the attribute values with the largest scores (in absolute value) appear higher in the list. Alternatively, the discrimination scores for all attribute values except distinguished values (e.g., $x_i$=0) are displayed. Also, non-binary attributes may be binarized into attributes that have only values 0 and non-zero before displaying.

The homogeneity of a category indicates how similar the records of the category are to one another. The homogeneity is given by the following:

$$hom(G) = \sum_{users} p(G|x_1,\ldots,x_m)\log p(x_1,\ldots,x_m|G) \quad (7)$$

where G represents a category or a combined category and where $p(G|x_1, \ldots, x_m)$ is the probability that category G contains the record with attribute values $x_1, \ldots, x_m$ (obtainable from Bayes rule).

Implementation

Figure 8:
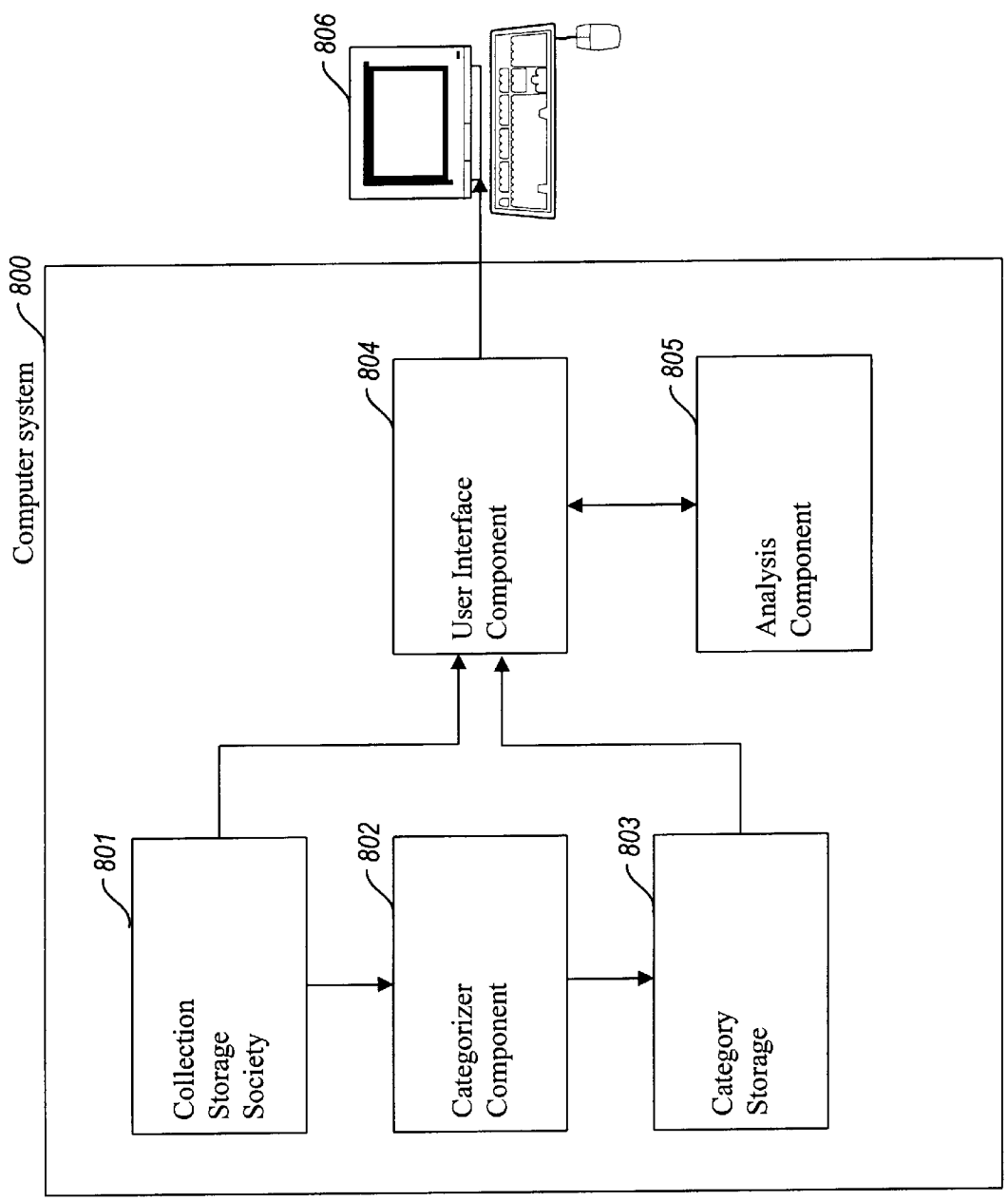
FIG. 8 illustrates the components of an embodiment of the category visualization system.

FIG. 8 illustrates the components of an embodiment of the CV system. The CV system executes on computer system 800 which includes a central processing unit, memory, and input/output devices. The CV system includes a collection storage component 801, a categorizer component 802, a category storage component 803, a user interface component 804, and analysis component 805. The collection storage component contains the attribute value for each attribute of each record in the collection. The categorizer component inputs the records of the collection storage component and identifies the various categories and stores the identification of the categories in the category storage component. The user interface component inputs data from the collection storage component and the category storage component and generates the various category graphs which are displayed on display 806. The user interface component invokes the analysis component to process the category storage information. The layout of the nodes can be determined by a variety of standard techniques for rendering graphs, including planar layouts, or any other scheme for minimizing edge crossings at display time.

Figure 9:
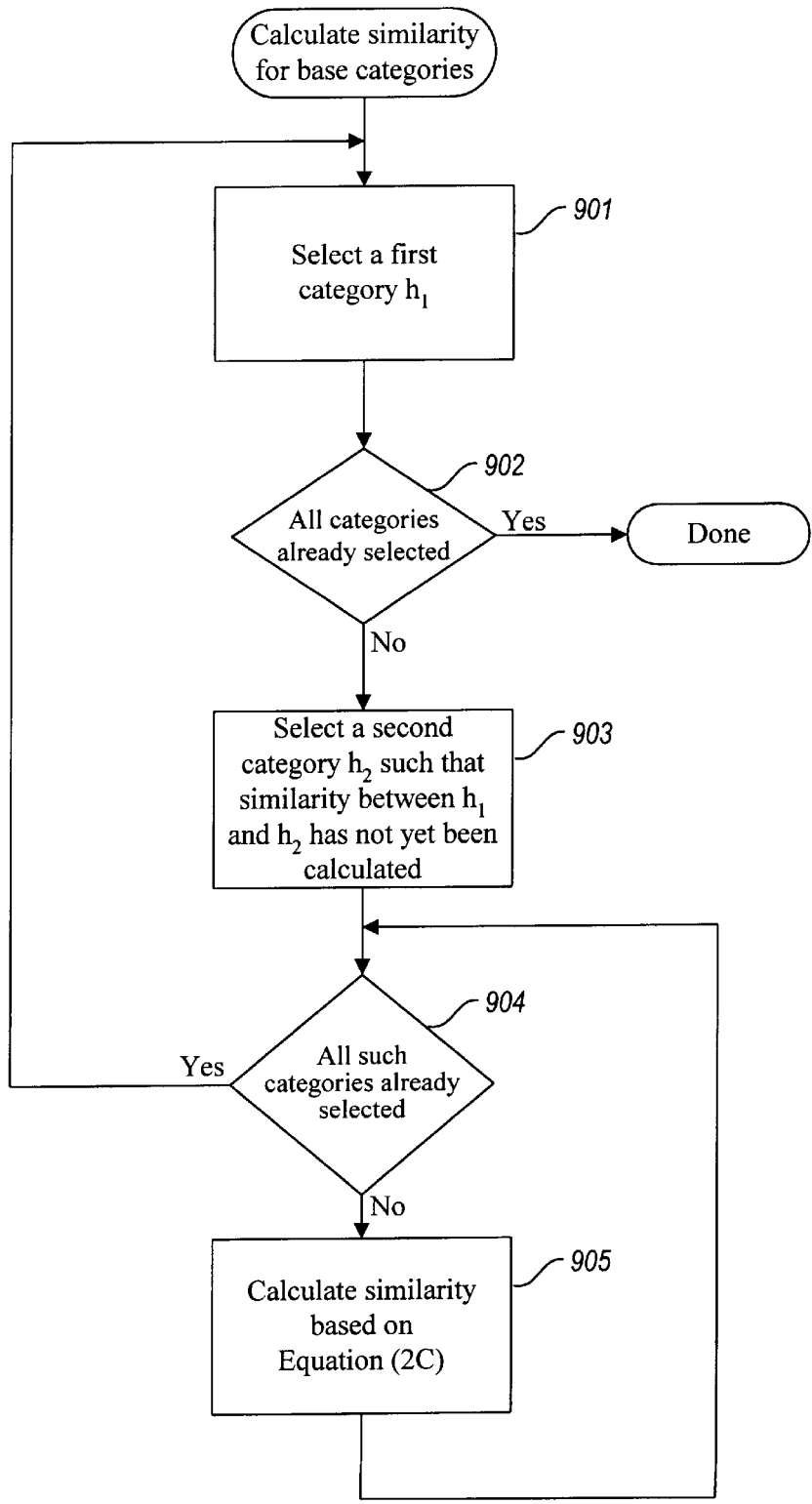
FIG. 9 is a flow diagram of a routine for calculating the similarity of base categories.

FIG. 9 is a flow diagram of a routine for calculating the similarity of base categories. The routine loops selecting each possible pair of base categories and calculating the similarity in accordance with Equation (2c) or Equation (2b) without the independence assumption. One skilled in the art will appreciate that many other distances for calculating the similarity of categories can be used. For example, one could use the average hamming distance between records in each category. In step 901, the routine selects a first category $h_1$. In step 902, if all the categories have already been selected as the first category, then the routine is done, else the routine continues at step 903. In step 903, the routine selects a second category $h_2$ for which the similarity between the first and second categories has not yet been calculated. In step 904, if all such categories have already been selected, then the routine loops to step 901 to select another first category, else the routine continues at step 905. In step 905, the routine calculates the similarity between the selected first and second categories and loops to step 903 to select another second category.

Figure 10:
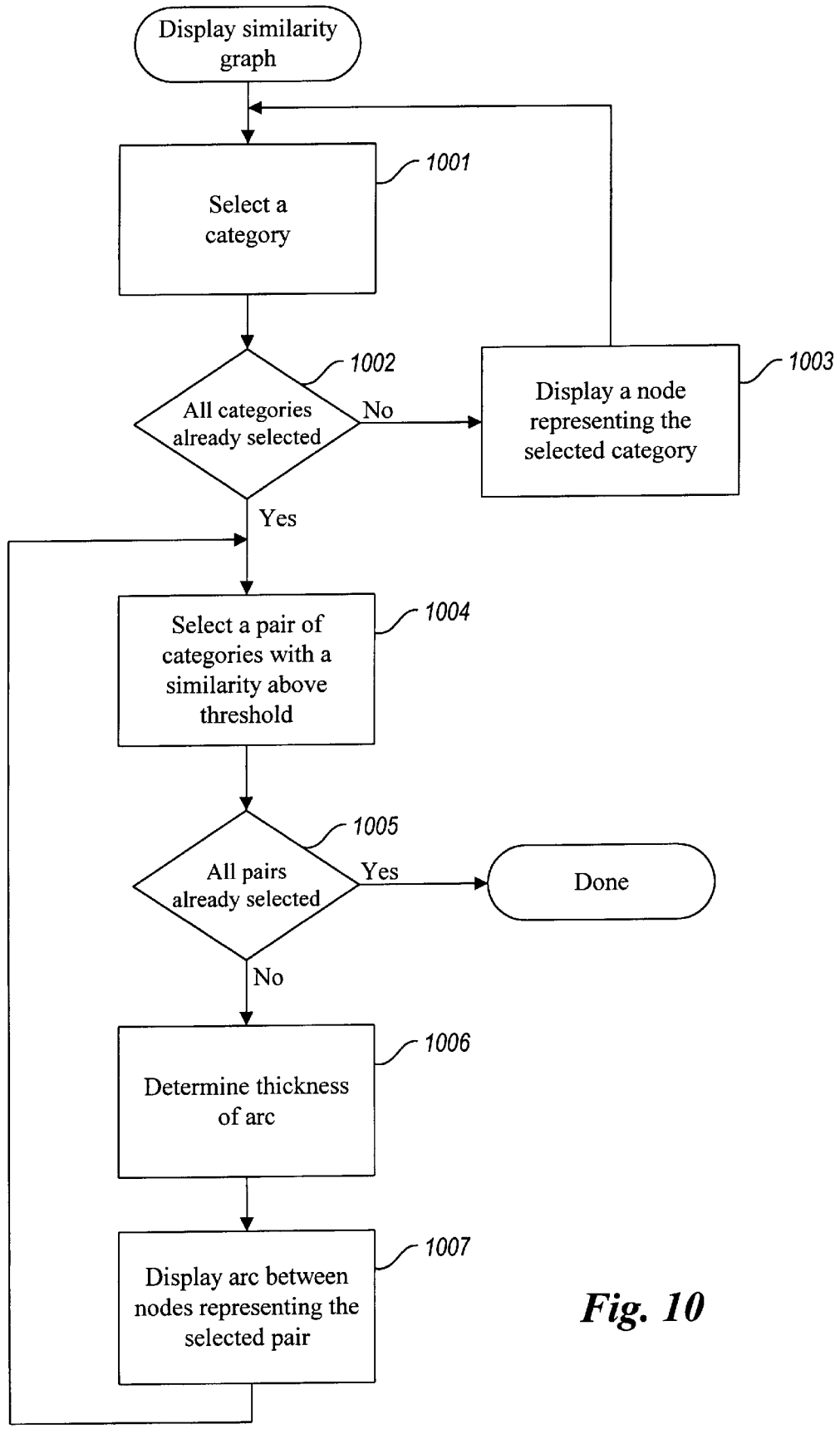
FIG. 10 is a flow diagram of a routine for displaying a similarity graph.

FIG. 10 is a flow diagram of a routine for displaying a similarity graph. The routines display a node for each base category and then displays an arc between those nodes representing categories whose similarity is above the similarity threshold. In steps 1001–1003, the routine loops displaying nodes for the categories. In step 1001, the routine selects a category that has not yet been selected. In step 1002, if all the categories have already been selected, then the routine continues at step 1004, else the routine continues at step 1003. In step 1003, the routine displays a node represent the selected category and loops to step 1001 to select the next category. In steps 1004–1007, the routine loops displaying the arcs. In step 1004, the routine selects a pair of categories with a similarity above the similarity threshold. In step 1005, if all such pairs of categories have already been selected, then the routine is done, else the routine continues at step 1006. In step 1006, the routine determines the thickness of the arc to be displayed between the selected pair of categories. In step 1007, the routine displays an arch of the determined thickness between the nodes representing the selected categories and loops to step 1004 to select another pair of categories.

Figure 11:
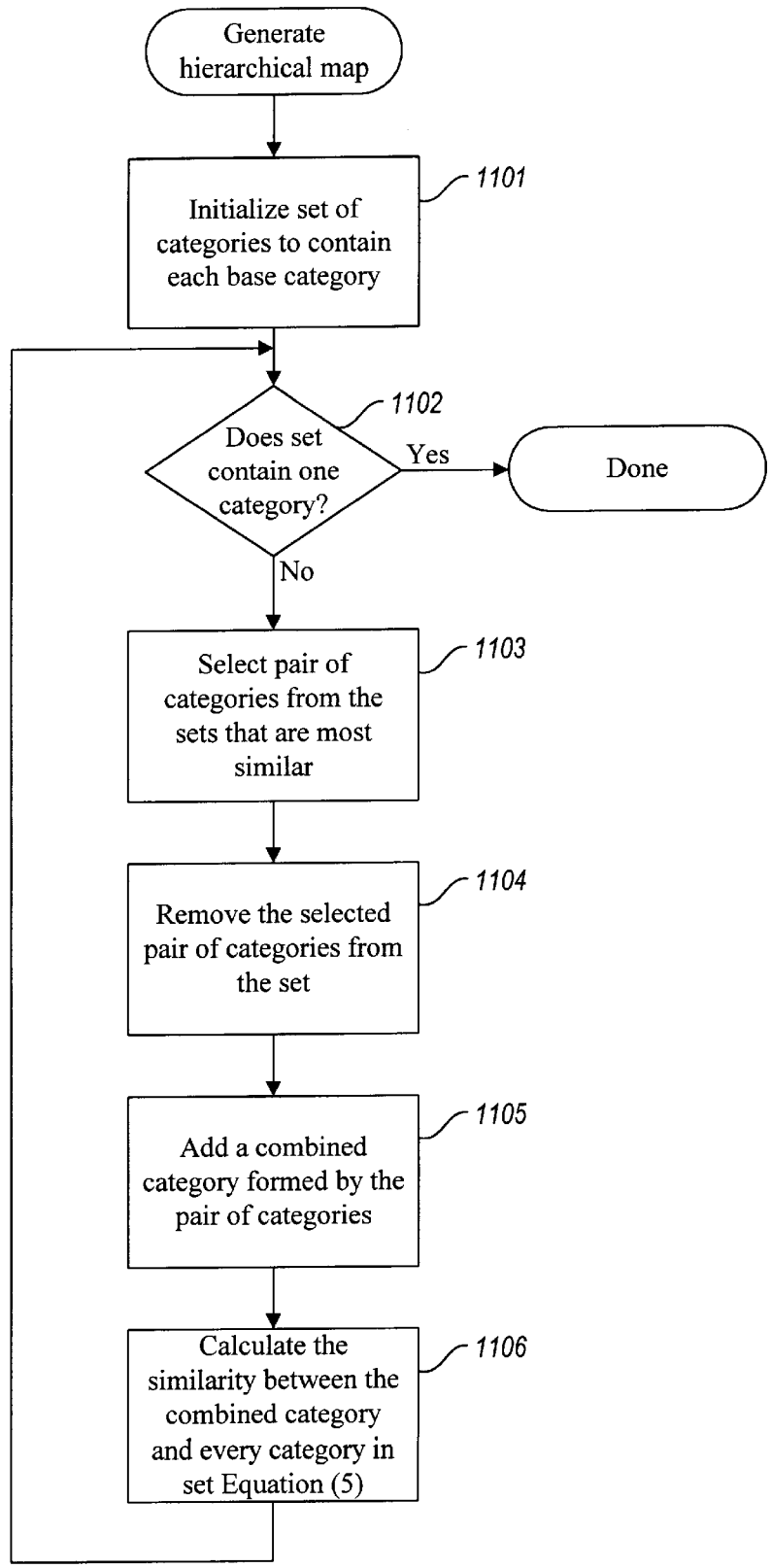
FIG. 11 is a flow diagram of a routine for generating a hierarchical map.

FIG. 11 is a flow diagram of a routine for generating a hierarchical map. The routine starts with the base categories and successively combines categories that are most similar. In step 1101, the routine initializes a set of categories to contain each base category. In step 1102, if the set contains only one category, then the hierarchical map is complete and the routine is done, else the routine continues at step 1103. In steps 1103, the routine selects the next pair of categories in the set that are most similar. Initially, the similarities of the base categories are calculated in accordance with the routine of FIG. 9. In step 1104, the routine removes the selected pair of categories from the set. In step 1105, the routine adds a combined category formed by the selected pair of categories to the set. In step 1106, the routine calculates the similarity between the combined category and every other category in the set according to Equation (5) and loops to step 1102 to determine whether the set contains only one category.

Figure 12:
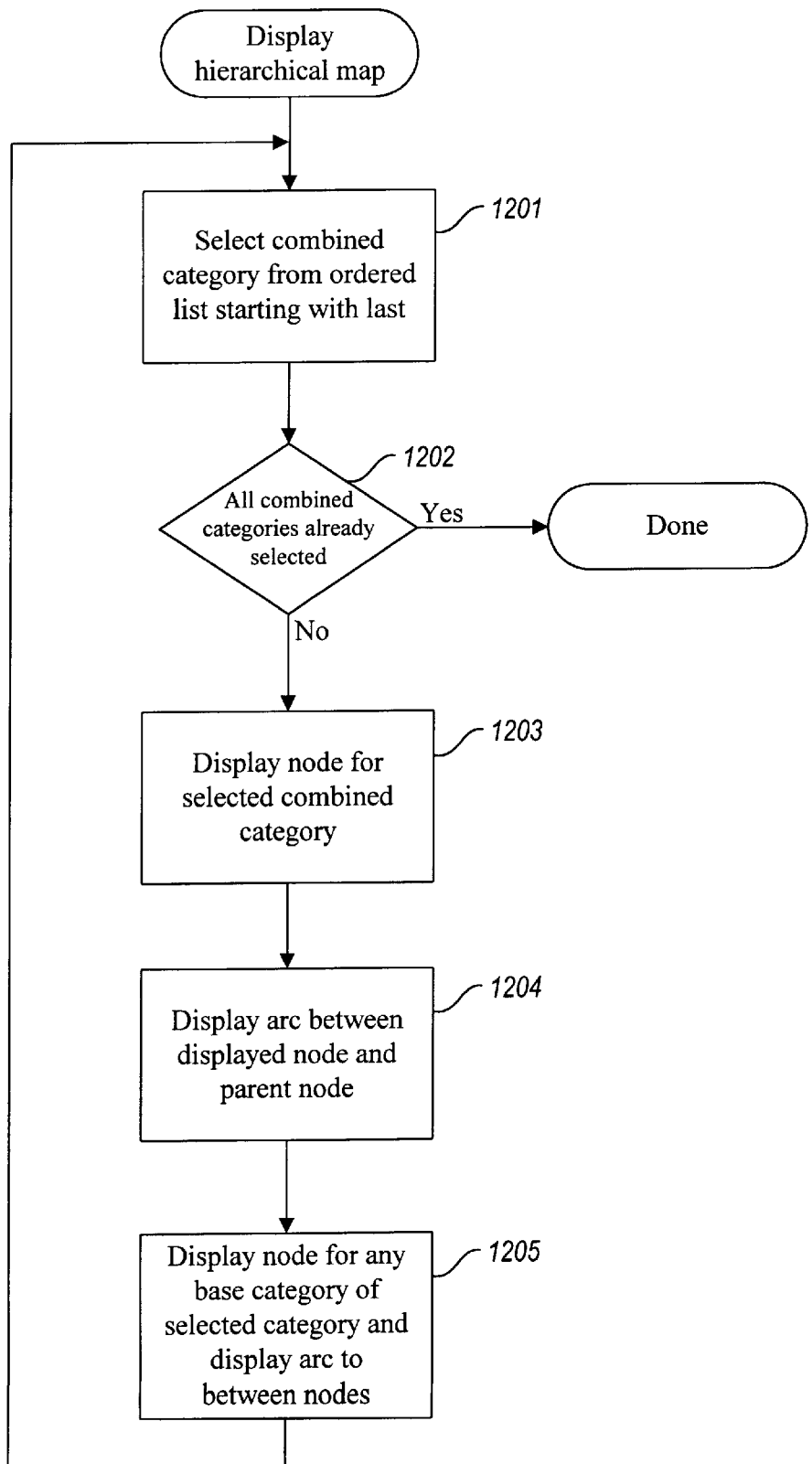
FIG. 12 is a flow diagram of a routine to display a hierarchical map.

FIG. 12 is a flow diagram of a routine to display a hierarchical map. In step 1201, the routine selects a combined category starting with the last combined category that was generated. In step 1202, if all the combined categories have already been selected, then the routine is done, else the routine continues at step 1203. In step 1203, the routine displayed a node representing the selected combined category. In step 1204, the routine displays an arc between the displayed node and its parent node. In step 1205, the routine displays a node representing any base sub-category of the combined category along with connecting arcs. The routine then loops to step 1201 to select the next combined category.

Although the present invention has been described in terms of various embodiments, it is not intended that the invention be limited to these embodiments, equivalents, methods, structures, processes, and steps. Note that modifications within the spirit of the invention fall within the scope of the invention. The scope of the present invention is defined by the claims that follows.

What is claimed is:

1. A method in a computer system for displaying a representation of categories of data, the method comprising:
   for each category, determining a similarity of that category to every other category so that a similarity is determined for each pair of categories;
   displaying an indication of each category; and
   for each pair of categories, displaying an indication of the determined similarity of the pair of categories, wherein the displayed indication is an arc connecting the displayed indication of each category in the pair of categories.

2. The method of claim 1 wherein the establishing of a similarity threshold includes receiving from a user an indication of the similarity threshold.

3. The method of claim 2 including displaying a slider so that the user can indicate the similarity threshold.

4. The method of claim 3 wherein the slider is displayed horizontally.

5. The method of claim 3 wherein the slider is displayed vertically.

6. The method of claim 2 wherein when the user establishes a new similarity threshold, adjusting the displayed indications of determined similarity to reflect the new similarity threshold.

7. A method in a computer system for displaying a representation of categories of data, the method comprising:
   for each category, determining a similarity of that category to every other category so that a similarity is determined for each pair of categories;
   displaying an indication of each category;
   for each pair of categories, displaying an indication of the determined similarity of the pair of categories;
   establishing a similarity threshold; and
   displaying the indication of the determined similarity for only those pairs of categories whose determined similarity is above the established similarity threshold.

8. A method in a computer system for displaying a representation of categories of data, the method comprising:

for each category, determining a similarity of that category to every other category so that a similarity is determined for each pair of categories;

displaying an indication of each category; and for each pair of categories, displaying an indication of the determined similarity of the pair of categories, wherein the displayed indication is an arc and thickness of the arc indicates the determined similarity between the pair of categories.

9. A method in a computer system for displaying a representation of categories of data, the method comprising:

for each category, determining a similarity of that category to every other category so that a similarity is determined for each pair of categories;

displaying an indication of each category;

for each pair of categories, displaying an indication of the determined similarity of the pair of categories;

receiving a selection of a displayed indication of a category; and in response to the selection, displaying information relating to the category;

wherein the data includes attributes and the information relating to the selected category identifies attributes that discriminate the selected category from another category.

10. The method of claim 9 wherein the identified attributes are ordered according to their ability to discriminate.

11. The method of claim 9 wherein a discrimination metric is given by the following equation:

$$discrim(x_i|G_1, G_2) = p(x_i|G_1) - p(x_i|G_2))\log\frac{p(x_i|G_1)}{p(x_i|G_2)} + (p(x_i|G_2) - p(x_i|G_1))\log\frac{1 - p(x_i|G_1)}{1 - p(x_i|G_2)}$$

where $x_i$ represents a value of attribute i and where $p(x_i|G)$ represents the conditional probability that a record with an attribute value $x_i$ given that the record is in category G.

12. The method of claim 11 wherein $$p(x_i|G) = \frac{\sum_{h_j \in G} p(h_j) \prod_i p(x_i|h_j)}{\sum_{h_j \in G} p(h_j)}$$

where $h_j$ represents category j, where $p(h_j)$ represents the probability that a record is in $h_j$, and where $p(x_i|h_j)$ is the conditional probability that a record has the value $X_i$ for attribute i is given that the record is in $h_j$.

13. A method in a computer system for displaying a representation of categories of data, the method comprising:

for each category, determining a similarity of that category to every other category so that a similarity is determined for each pair of categories;

displaying an indication of each category;

for each pair of categories, displaying an indication of the determined similarity of the pair of categories;

receiving an indication to de-emphasize a category; and in response to the indication to de-emphasize a category, de-emphasizing the displayed indication of the category.

14. The method of claim 13 including:

in response to receiving the indication to de-emphasize a category, removing the displayed indication of the de-emphasized category.

15. The method of claim 13 wherein the de-emphasizing is dimming of the displayed indication of the de-emphasized category.

16. The method of claim 13 wherein the de-emphasizing is hiding of the displayed indication of the category.

17. A method in a computer system for displaying a representation of categories of data, the method comprising:

for each category, determining a similarity of that category to every other category so that a similarity is determined for each pair of categories;

displaying an indication of each category;

for each pair of categories, displaying an indication of the determined similarity of the pair of categories;

receiving an indication to split a combined category; and in response to the indication to split a combined category, displaying an indication of a pair of categories for the combined category.

18. The method of claim 17 including:

displaying a slider and wherein movement of the displayed slider indicates to split a combined category.

19. The method of claim 17 wherein the displaying an indication of a pair of categories includes displaying an animation of splitting the indication of the combined category into the pair of indications of categories.

20. The method of claim 17 wherein the category to be split is the combined category that was last combined.

21. The method of claim 17 including:

displaying a control and wherein selection of the control indicates to split categories.

22. A method in a computer system for displaying a representation of categories of data, the method comprising:

receiving a hierarchical organization of the categories, the categories including a root category and leaf categories, each category except the leaf categories being a combined category;

displaying an indication of each category in the hierarchical organization;

receiving an indication to de-emphasize a specific category; and in response to the indication to de-emphasize a category, de-emphasizing the displayed indications of categories in a sub-tree of which the specific category is a root.

23. The method of claim 22 including wherein the de-emphasizing is removing of the displayed indications.

24. The method of claim 22 wherein the de-emphasizing is dimming of the displayed indications.

25. The method of claim 22 wherein the de-emphasizing is hiding of the displayed indications.

26. A method in a computer system for displaying a representation of categories of data, the method comprising:

receiving a hierarchical organization of the categories, the categories including a root category and leaf categories, each category except the leaf categories being a combined category;

displaying an indication of each category in the hierarchical organization;

receiving an indication to de-emphasize a specific category; and in response to the indication to de-emphasize a category, removing all displayed indications of categories in a sub-tree of which the specific category is a root, excluding the displayed indication of the category corresponding to the root of the sub-tree.

27. A method in a computer system for displaying a representation of categories of data, the method comprising:

receiving a hierarchical organization of the categories, the categories including a root category and leaf categories, each category except the leaf categories being a combined category;

displaying an indication of each category in the hierarchical organization;

receiving a selection of a displayed indication of a category; and in response to the selection, displaying information relating to the selected category.

28. The method of claim 27 wherein the information is comparison information with a category that is a parent of the selected category.

29. The method of claim 27 wherein the information is comparison information with a category that is a sibling of the selected category.

30. The method of claim 27 wherein the information is comparison information with all categories other than the selected category.

31. The method of claim 27 wherein the information is comparison information with child categories of the selected category.

32. The method of claim 27 wherein the information is weights of evidence information.

33. The method of claim 27 wherein the data includes attributes and the information relating to the selected category identifies attributes that discriminate the selected category from an other category.

34. The method of claim 33 wherein the identified attributes are ordered according to their ability to discriminate.

35. The method of claim 34 wherein a discrimination metric, reflecting the identified attributes, is given by the following equation:

$$discrim(x_i|G_1, G_2) = p(x_i|G_1) -$$
$$p(x_i|G_2))\log\frac{p(x_i|G_1)}{p(x_i|G_2)} + (p(x_i|G_2) - p(x_i|G_1))\log\frac{1 - p(x_i|G_1)}{1 - p(x_i|G_2)}$$

where $x_i$ represents a value of attribute i and where $p(x_i|G)$ represents the conditional probability that a record with an attribute value $x_i$ given that the record is in category G.

36. The method of claim 35 wherein $$p(x_i|G) = \frac{\sum_{h_j \in G} p(h_j) \prod_i p(x_i|h_j)}{\sum_{h_j \in G} p(h_j)}$$

where $h_j$ represents category j, where $p(h_j)$ represents the probability that a record is in $h_j$, and where $p(x_i|h_j)$ is the conditional probability that a record has the value $X_i$ for attribute i is given that the record is in $h_j$.

37. The method of claim 27 wherein the data includes attributes and wherein the information relating to the selected category identifies attributes are characteristic of the selected category.

38. The method of claim 27 wherein the information relating to the selected category is indicates the homogeneity of the category.

39. The method of claim 27 wherein a homogeneity is given by the following equation:

$$hom(G) = \sum_{users} p(G|x_1, ..., x_m)\log p(x_1, ..., x_m|G)$$

where G represents a category or combined category, where $p(G|x_1, ..., x_m)$ represents the probability that category G contains the record with attribute values $x_1, ..., x_m$, and where $p(x_1, ..., x_m|G)$ represents the conditional probability that a record has attribute values $x_1, ..., x_m$ given that it is in category G.

40. The method of claim 27 wherein the displayed information relates to the similarity of a sub-categories of a combined category.

41. A method in a computer system for displaying a representation of categories of data, the method comprising:

receiving a hierarchical organization of the categories, the categories including a root category and leaf categories, each category except the leaf categories being a combined category; and displaying an indication of each category in the hierarchical organization;

wherein the displayed indication of each category includes an indication of the number of records in said each category.

42. The method of claim 41 wherein the indication of the number of records is shading of a portion of the displayed indication of the category in proportion to the number of records in the category to total number of records in all categories.

* * * * *